US007536495B2

(12) United States Patent
Ashmore et al.

(10) Patent No.: US 7,536,495 B2
(45) Date of Patent: May 19, 2009

(54) CERTIFIED MEMORY-TO-MEMORY DATA TRANSFER BETWEEN ACTIVE-ACTIVE RAID CONTROLLERS

(75) Inventors: Paul Andrew Ashmore, Longmont, CO (US); Ian Robert Davies, Longmont, CO (US); Gene Maine, Erie, CO (US); Rex Weldon Vedder, Boulder, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 774 days.

(21) Appl. No.: 11/317,504

(22) Filed: Dec. 22, 2005

(65) Prior Publication Data
US 2006/0106982 A1    May 18, 2006

Related U.S. Application Data

(63) Continuation-in-part of application No. 09/967,126, filed on Sep. 28, 2001, now Pat. No. 7,062,591, and a continuation-in-part of application No. 09/967,194, filed on Sep. 28, 2001, now Pat. No. 7,437,493, and a continuation-in-part of application No. 10/368,688, filed on Feb. 18, 2003, now Pat. No. 7,143,227, and a continuation-in-part of application No. 10/946,341, filed on Sep. 21, 2004, now Pat. No. 7,146,448, and a continuation-in-part of application No. 11/178,727, filed on Jul. 11, 2005, now Pat. No. 7,315,911, and a continuation-in-part of application No. 11/272,340, filed on Nov. 10, 2005, now Pat. No. 7,340,555, said application No. 10/946,341 is a continuation-in-part of application No. 09/967,027, filed on Sep. 28, 2001, now Pat. No. 6,839,788.

(60) Provisional application No. 60/554,052, filed on Mar. 17, 2004, provisional application No. 60/645,340, filed on Jan. 20, 2005, provisional application No. 60/694,443, filed on Jun. 27, 2005.

(51) Int. Cl.
*G06F 13/00* (2006.01)
*G06F 12/16* (2006.01)

(52) U.S. Cl. .......................... 710/313; 710/33; 710/310; 711/114

(58) Field of Classification Search ............. 710/33–38, 710/306–313; 711/111–114, 154–156
See application file for complete search history.

(56) References Cited

U.S. PATENT DOCUMENTS 4,217,486 A    8/1980    Tawfik et al.
4,251,869 A    2/1981    Shaffer (Continued)

FOREIGN PATENT DOCUMENTS

EP    0800138 A    10/1997

(Continued)

OTHER PUBLICATIONS

Makijarvi, Petri. "PICMG1.3 SHB Raid Performance: Evaluating Next Generation High-Performance PC 4U Computers." Jul. 4, 2007.

(Continued)

*Primary Examiner*—Raymond N Phan
(74) *Attorney, Agent, or Firm*—E. Alan Davis; James W. Huffman

(57) ABSTRACT

A system for performing an efficient mirrored posted-write operation having first and second RAID controllers in communication via a PCI-Express link is disclosed. The first bus bridge transmits a PCI-Express memory write request TLP to the second bus bridge. The TLP header includes an indication of whether the first CPU requests a certification that certifies the payload data has been written to the second write cache memory. If the indication requests the certification, the second bus bridge automatically transmits the certification to the first bus bridge independent of the second CPU, after writing the payload data to the second write cache memory. The first bus bridge generates an interrupt to the first CPU in response to receiving the certification. The certified transfer may be used to validate and/or invalidate mirrored copies of a write cache directory on the RAID controllers, among other uses.

55 Claims, 7 Drawing Sheets

U.S. PATENT DOCUMENTS

| | | | |
|---|---|---|---|
| 4,428,044 | A | 1/1984 | Liron |
| 5,345,565 | A | 9/1994 | Jibbe et al. |
| 5,408,644 | A | 4/1995 | Schneider et al. |
| 5,483,528 | A | 1/1996 | Christensen |
| 5,530,842 | A | 6/1996 | Abraham et al. |
| 5,553,023 | A | 9/1996 | Lau et al. |
| 5,613,068 | A | 3/1997 | Gregg et al. |
| 5,619,642 | A | 4/1997 | Nielson et al. |
| 5,619,644 | A | 4/1997 | Crockett et al. |
| 5,668,956 | A | 9/1997 | Okazawa et al. |
| 5,680,579 | A | 10/1997 | Young et al. |
| 5,706,283 | A | 1/1998 | Suzuki |
| 5,754,884 | A | 5/1998 | Swanstrom |
| 5,802,602 | A | 9/1998 | Rahman et al. |
| 5,812,754 | A | 9/1998 | Lui et al. |
| 5,881,254 | A | 3/1999 | Corrigan et al. |
| 6,009,275 | A | 12/1999 | DeKoning et al. |
| 6,038,680 | A | 3/2000 | Olarig |
| 6,058,455 | A | 5/2000 | Islam et al. |
| 6,094,699 | A | 7/2000 | Surugucchi et al. |
| 6,098,140 | A | 8/2000 | Pecone et al. |
| 6,185,652 | B1 | 2/2001 | Shek et al. |
| 6,223,252 | B1 | 4/2001 | Bandera et al. |
| 6,243,829 | B1 | 6/2001 | Chan |
| 6,272,533 | B1 | 8/2001 | Browne |
| 6,397,293 | B2 | 5/2002 | Shrader et al. |
| 6,421,769 | B1 | 7/2002 | Teitenberg et al. |
| 6,438,603 | B1 | 8/2002 | Ogus |
| 6,470,429 | B1 | 10/2002 | Jones et al. |
| 6,493,795 | B1 | 12/2002 | Arsenault et al. |
| 6,502,157 | B1 | 12/2002 | Batchelor et al. |
| 6,507,581 | B1 | 1/2003 | Sgammato |
| 6,629,179 | B1 | 9/2003 | Bashford |
| 6,718,408 | B2 | 4/2004 | Esterberg et al. |
| 6,732,243 | B2 | 5/2004 | Busser et al. |
| 6,839,788 | B2 | 1/2005 | Pecone |
| 6,912,621 | B2 | 6/2005 | Harris |
| 6,944,617 | B2 * | 9/2005 | Harriman ............ 707/100 |
| 7,046,668 | B2 | 5/2006 | Pettey et al. |
| 7,069,368 | B2 | 6/2006 | Thornton |
| 7,071,946 | B2 | 7/2006 | Jeddeloh |
| 7,107,343 | B2 | 9/2006 | Rinaldis et al. |
| 7,149,819 | B2 * | 12/2006 | Pettey ............ 709/250 |
| 7,457,902 | B2 | 11/2008 | Yang et al. |
| 2001/0013076 | A1 | 8/2001 | Yamamoto |
| 2002/0029319 | A1 | 3/2002 | Robbins et al. |
| 2002/0069317 | A1 | 6/2002 | Chow et al. |
| 2002/0069334 | A1 | 6/2002 | Hsia et al. |
| 2002/0083111 | A1 | 6/2002 | Row et al. |
| 2002/0091828 | A1 | 7/2002 | Kitamura et al. |
| 2002/0099881 | A1 | 7/2002 | Gugel |
| 2002/0194412 | A1 | 12/2002 | Bottom |
| 2003/0065733 | A1 | 4/2003 | Pecone |
| 2003/0065836 | A1 | 4/2003 | Pecone |
| 2003/0217211 | A1 | 11/2003 | Rust et al. |
| 2004/0064638 | A1 | 4/2004 | Chong, Jr. |
| 2004/0177126 | A1 | 9/2004 | Maine |
| 2004/0221198 | A1 | 11/2004 | Vecoven |
| 2005/0044169 | A1 | 2/2005 | Arbeitman et al. |
| 2005/0102549 | A1 | 5/2005 | Davies et al. |
| 2005/0102557 | A1 | 5/2005 | Davies et al. |
| 2006/0161707 | A1 | 7/2006 | Davies et al. |
| 2006/0230218 | A1 | 10/2006 | Warren et al. |
| 2006/0242312 | A1 | 10/2006 | Crespi et al. |
| 2006/0248308 | A1 | 11/2006 | Wang et al. |
| 2006/0248400 | A1 | 11/2006 | Miyamoto |
| 2006/0277347 | A1 | 12/2006 | Ashmore et al. |
| 2006/0282701 | A1 | 12/2006 | Davies et al. |
| 2008/0005410 | A1 | 1/2008 | Mies et al. |
| 2008/0005470 | A1 | 1/2008 | Davies |
| 2008/0201616 | A1 | 8/2008 | Ashmore |

FOREIGN PATENT DOCUMENTS

| | | |
|---|---|---|
| EP | 0817054 | 1/1998 |
| EP | 0967552 | 12/1999 |
| GB | 2396726 A | 6/2004 |
| JP | 2001142648 | 5/2001 |
| WO | WO0182077 | 11/2001 |
| WO | WO2006124217 | 11/2006 |
| WO | WO2007002219 | 1/2007 |

OTHER PUBLICATIONS

Luse, Paul. "The Benefits of Raid on Motherboard." May 2003.
Overland Storage. "Tiered Data Protection Made Simple." 2008.
DCM Presentation. DCM Technologies, 39675 Cedar Blvd. #220, Newark, CA 94560.
"PEX 8114: PCI-X -PCI Express Bridge." Data Book. Version 0.70. May 2004. PLX Technology, Inc.
"Corex-V10 PCI-X Initiator/Target" Datasheet #2. DCM Technologies, 39675 Cedar Blvd., #220, Newark, CA 94560.
"DCM Corex-V10 FAQ." version 1.00. DCM Technologies, 39675 Cedar Blvd., #220, Newark, CA 94560.
IDT. "24-lane 3-Port PCI Express Switch" Data Sheet. 89HPES24N3. Feb. 14, 2006. Integrated Device Technology, Inc.
"DCM PCI-X Verification Services" Datasheet #2. DCM Technologies, 39675 Cedar Blvd., #220, Newark, CA 94560.
IDT. "12-lane 3-Port PCI Express Switch" Data Sheet. 89HPES12N3. Feb. 14, 2006. Integrated Device Technology, Inc.
IDT. "12-lane 3-Port PCI Express Switch" Product Brief. 89PES12N3. Feb. 15, 2006. Integrated Device Technology, Inc.
"Intel 41210 Serial to Parallel PCI Bridge Datasheet." Intel Corporation. Sep. 2003.
"Intel 41210 Serial to Parallel PCI Bridge Design Guide." Intel Corporation. Nov. 2003.
QuickLogic PCI Presentation. "QuickPCI™ Family of Embedded Standard Products (ESPs)."
"QL5064—QuickPCI™" DataSheet, Rev B. Feb. 2, 2000. QuickLogic.
"IDT 89HPES12N3 PCI Express Switch." User Manual Table of Contents & Overview. Integrated Device Technology. Feb. 8, 2006.
"IDT 89HPES24N3 PCI Express Switch." User Manual Table of Contents & Overview. Integrated Device Technology. Feb. 8, 2006.
Young et al. *A high I/O reconfigurable crossbar switch*. 11th Annual IEEE Symposium on Field-Programmable Custom Computing Machines, 2003. FCCM 2003. Apr. 9-11, 2003. pp. 3-10.
Landman et al. *Activity-sensitive architectural power analysis*. IEEE Transactions on Computer-Aided Design of Integrated Circuits and Systems. Jun. 1996. pp. 571-587.
U.S. Office Action for U.S. Appl. No. 09/967,027, Examiner G. Ray, Apr. 30, 2004, pp. 1-7 and cover sheet.
U.S. Office Action for U.S. Appl. No. 09/967,126, Examiner T. Vo, Mar. 7, 2005, pp. 1-5 and cover sheet.
European Examination Report for Application No. GB0406742.7, dated Nov. 10, 2004.
European Examination Report for Application No. GB0406739.3, dated Nov. 10, 2004.
European Examination Report for Application No. GB0406740.1, dated Nov. 10, 2004.
LSI Corporation. MegaRAID SAS 8408E. Product Brief. 2007.
"DCM PCI-X Verification Services" Datasheet #1. DCM Technologies, 39675 Cedar Blvd., #220, Newark, CA 94560.
"PCI-X Synthesizable Core." inSilicon Corporation. San Jose, CA. 1999.
"IBM 133 PCI-X Bridge" Datasheet. April 6, 2001.
"IBM 133 PCI-X Bridge" Datasheet 2000. IBM Microelectronics Division.
"Tsi320™ Software Initialization Application Note." Oct. 2001. 80A600B_AN002_01. Tundra Semiconductor Corporation.
"PCI-X Bus Test Environment." 1999. inSilicon Corporation 411 East Plumeria Dr. San Jose, CA 95134.
"1005 IDT Precise PCI-Express Family Presentation." Integrated Device Technology.

"COMPAQ Rapid Enabler for PCI-X (CREX) Initiator Interface." (Preliminary). Revision 0.28 Sep. 2, 1999.

"COMPAQ Rapid Enabler for PCI-X (CREX) Target Bus Interface." (Preliminary). Revision 0.36 Sep. 2, 1999.

"Intel 41210 Serial to Parallel PCI Bridge Product Brief." Intel Corporation. 2003.

PERICOM. "Bridge Products Road Map." Customer Presentation. pp. 31, 33-35.

IDT. "24-lane 3-Port PCI Express Switch" Product Brief. 89PES24N3. Dec. 22, 2005. Integrated Device Technology, Inc.

"PEX 8104" Data Book. Version 0.61. Mar. 2004. PLX Technology, Inc.

"PEX 8114 PCI Express to PCI/PCI-X Bridge." Product Brief. Version 2.0. 2004. PLX Technology, Inc.

"Tsi320™ PCI/X-to-PCI/X Bus Bridge Manual." Jan. 2001. 80A600B_MA001_02. Tundra Semiconductor Corporation.

"Tsi320™ Dual-Mode PCI-to-PCI Bus Bridge Errata." Sep. 2001. 80A600B_ER001_05. Tundra Semiconductor Corporation.

"Tsi320 ™Dual-Mode PCI-to-PCI Bus Bridge User Manual." Jun. 2001. 80A600B_MA001_04. Tundra Semiconductor Corporation.

"Corex-V10 PCI-X Initiator/Target" Datasheet #1. DCM Technologies, 39675 Cedar Blvd., #220, Newark, CA 94560.

"X-caliber Design Specification: PCI-2.2/PCI-X Megacell" Rev 0.99.3. Nov. 19, 1999.

Budruk et al. "PCI Express System Architecture." Addison Wesley Professional. Sep. 4, 2003.

PCI-SIG. PCI Express Base Specification Revision 1.0A. Apr. 15, 2003.

* cited by examiner

406 CERTIFY flag

408 DELIVERED flag

CERTIFIED MEMORY-TO-MEMORY DATA TRANSFER BETWEEN ACTIVE-ACTIVE RAID CONTROLLERS

CROSS REFERENCE TO RELATED APPLICATIONS

This application is a continuation-in-part (CIP) of the following co-pending Non-Provisional U.S. Patent Applications, which are hereby incorporated by reference in their entirety for all purposes:

| Ser. No. (Docket No.) | Filing Date | Title |
|---|---|---|
| 09/967,126 (4430-29) | Sep. 28, 2001 | CONTROLLER DATA SHARING USING A MODULAR DMA ARCHITECTURE |
| 09/967,194 (4430-32) | Sep. 28, 2001 | MODULAR ARCHITECTURE FOR NETWORK STORAGE CONTROLLER |
| 10/368,688 (CHAP.0101) | Feb. 18, 2003 | BROADCAST BRIDGE APPARATUS FOR TRANSFERRING DATA TO REDUNDANT MEMORY SUBSYSTEMS IN A STORAGE CONTROLLER |
| 10/946,341 (CHAP.0113) | Sep. 21, 2004 | APPARATUS AND METHOD FOR ADOPTING AN ORPHAN I/O PORT IN A REDUNDANT STORAGE CONTROLLER |
| 11/178,727 (CHAP.0125) | Jul. 11, 2005 | METHOD FOR EFFICIENT INTER-PROCESSOR COMMUNICATION IN AN ACTIVE RAID SYSTEM USING PCI-EXPRESS LINKS |
| 11/272,340 (CHAP.0126) | Nov. 10, 2005 | RAID SYSTEM FOR PERFORMING EFFICIENT MIRRORED POSTED-WRITE OPERATIONS |

Pending U.S. patent application Ser. No. 10/946,341 (CHAP.0113) is a continuation-in-part (CIP) of the following U.S. Patent, which is hereby incorporated by reference in its entirety for all purposes:

| U.S. Pat. No. | Issue Date | Title |
|---|---|---|
| 6,839,788 | Jan. 4, 2005 | BUS ZONING IN A CHANNEL INDEPENDENT CONTROLLER ARCHITECTURE |

Pending U.S. patent application Ser. No. 10/946,341 (CHAP.0113) is a continuation-in-part (CIP) of the following co-pending Non-Provisional U.S. Patent Applications, which are hereby incorporated by reference in their entirety for all purposes:

| Ser. No. (Docket No.) | Filing Date | Title |
|---|---|---|
| 09/967,126 (4430-29) | Sep. 28, 2001 | CONTROLLER DATA SHARING USING A MODULAR DMA ARCHITECTURE |
| 09/967,194 (4430-32) | Sep. 28, 2001 | MODULAR ARCHITECTURE FOR NETWORK STORAGE CONTROLLER |
| 10/368,688 (CHAP.0101) | Feb. 18, 2003 | BROADCAST BRIDGE APPARATUS FOR TRANSFERRING DATA TO REDUNDANT MEMORY SUBSYSTEMS IN A STORAGE CONTROLLER |

Pending U.S. patent application Ser. No. 10/946,341 (CHAP.0113) claims the benefit of the following expired U.S. Provisional Application, which is hereby incorporated by reference in its entirety for all purposes:

| Ser. No. (Docket No.) | Filing Date | Title |
|---|---|---|
| 60/554,052 (CHAP.0111) | Mar. 17, 2004 | LIBERTY APPLICATION BLADE |

Pending U.S. patent application Ser. No. 11/178,727 (CHAP.0125) claims the benefit of the following pending U.S. Provisional Application, which is hereby incorporated by reference in its entirety for all purposes:

| Ser. No. (Docket No.) | Filing Date | Title |
|---|---|---|
| 60/645,340 (CHAP.0125) | Jan. 20, 2005 | METHOD FOR EFFICIENT INTER-PROCESSOR COMMUNICATION IN AN ACTIVE—ACTIVE RAID SYSTEM USING PCI-EXPRESS LINKS |

This application claims the benefit of the following Provisional U.S. Patent Application, which is hereby incorporated by reference in its entirety for all purposes:

| Ser. No. (Docket No.) | Filing Date | Title |
|---|---|---|
| 60/694,443 (CHAP.0129) | Jun. 27, 2005 | HARDWARE ASSISTED CERTIFIED MESSAGE DELIVERY BETWEEN TWO CONTROLLERS IN AN ACTIVE—ACTIVE RAID CONTROLLER ENVIRONMENT |

Pending U.S. patent application Ser. No. 11/272,340 (CHAP.0126) is a continuation-in-part (CIP) of pending U.S. patent application Ser. No. 09/967,126 (4430-29), No. 09/967,194 (4430-32), No. 10/368,688 (CHAP.0101), No. 10/946,341 (CHAP.0113), and No. 11/178,727 (CHAP.0125).

FIELD OF THE INVENTION

The present invention relates in general to the field of mirrored redundant RAID controllers, and particularly to efficient memory-to-memory data transfers there between.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

One technique for providing high data availability in RAID systems is to include redundant fault-tolerant RAID controllers in the system. Providing redundant fault-tolerant RAID controllers means providing two or more controllers such that if one of the controllers fails, one of the other redundant controllers continues to perform the function of the failed controller. For example, some RAID controllers include redundant hot-pluggable field replaceable units (FRUs) such that when a controller fails, an FRU can be quickly replaced in many cases to restore the system to its original data availability level.

An important characteristic of RAID controllers, particularly in certain applications such as transaction processing or real-time data capture of large data streams, is to provide fast write performance. In particular, the overall performance of the computer system may be greatly improved if the write latency of the RAID controller is relatively small. The write latency is the time the RAID controller takes to complete a write request from the computer system.

Many RAID controllers include a relatively large cache memory for caching user data from the disk drives. Caching the data enables the RAID controller to quickly return data to the computer system if the requested data is in the cache memory since the RAID controller does not have to perform the lengthy operation of reading the data from the disk drives. The cache memory may also be employed to reduce write request latency by enabling what is commonly referred to as posted-write operations, or write-caching operations. In a posted-write operation, the RAID controller receives the data specified by the computer system from the computer system into the RAID controller's cache memory and then immediately notifies the computer system that the write request is complete, even though the RAID controller has not yet written the data to the disk drives. Posted-writes are particularly useful in RAID controllers, since in some redundant RAID levels a read-modify-write operation to the disk drives must be performed in order to accomplish the system write request. That is, not only must the specified system data be written to the disk drives, but some of the disk drives may also have to be read before the user data and redundant data can be written to the disks, which, without the benefit of posted-writes, may make the write latency of a RAID controller even longer than a non-RAID controller.

However, posted-write operations make the system vulnerable to data loss in the event of a failure of the RAID controller before the user data has been written to the disk drives. To reduce the likelihood of data loss in the event of a write-caching RAID controller failure in a redundant RAID controller system, the user data is written to both of the RAID controllers so that if one controller fails, the other controller can flush the posted-write data to the disks. Writing the user data to the write cache of both RAID controllers is commonly referred to as a mirrored write operation. If write-posting is enabled, then the operation is a mirrored posted-write operation.

Mirrored posted-write operations require communication between the two controllers to provide synchronization between the write caches of the two controllers to insure the correct user data is written to the disk drives. This cache synchronization communication may be inefficient. In particular, the communication may introduce additional latencies into the mirrored posted-write operation and may consume precious processing bandwidth of the CPUs on the RAID controllers. Therefore what is needed is a more efficient means for performing mirrored posted-write operations in redundant RAID controller systems.

BRIEF SUMMARY OF INVENTION

The present invention provides a system and method for performing a certified memory-to-memory transfer of data on a PCI-Express link from a primary RAID controller to a secondary RAID controller in which a bus bridge on the secondary RAID controller automatically returns a delivery certificate to the bus bridge on the primary RAID controller to indicate it has successfully written the data to the secondary cache memory, without involving the CPU on the secondary RAID controller; and, when the primary bus bridge receives the delivery certificate, it interrupts the primary CPU to indicate the data has been successfully written to the secondary cache memory. The certified memory-to-memory transfer may be employed, for example, to perform efficient validation and/or invalidation of a mirrored copy of a write cache directory during a mirrored posted-write operation. The operation is more efficient because the secondary CPU does not have to be involved in the write cache directory validation and/or invalidation.

In one aspect, the present invention provides a system for performing a mirrored posted-write operation. The system includes first and second redundant array of inexpensive disks (RAID) controllers in communication via a PCI-Express link. Each RAID controller includes a CPU, a write cache memory, and a bus bridge coupled to the CPU, the write cache memory, and the communications link. The first bus bridge is configured to transmit a PCI-Express memory write request transaction layer packet (TLP) on the link to the second bus bridge. The TLP includes payload data and a header. The header includes an indication of whether a certification is requested by the first CPU. The certification certifies that the payload data has been written to the second write cache memory. If the indication requests the certification, the second bus bridge automatically transmits the certification to the first bus bridge independent of the second CPU after writing the payload data to the second write cache memory. The first bus bridge generates an interrupt to the first CPU in response to receiving the certification.

In another aspect, the present invention provides a method for performing a certified memory-to-memory transfer operation between first and second redundant array of inexpensive disks (RAID) controllers in communication via a PCI-Express link. Each RAID controller includes a CPU, a write cache memory, and a bus bridge coupled to the CPU, the write cache memory, and the communications link. The method includes the first bus bridge transmitting a PCI-Express memory write request transaction layer packet (TLP) on the link to the second bus bridge. The TLP includes payload data and a header. The header includes an indication of whether a certification is requested by the first CPU. The certification certifies that the payload data has been written to the second write cache memory. The method also includes the second bus bridge determining whether the indication requests the certification. The method also includes the second bus bridge automatically transmitting the certification to the first bus bridge independent of the second CPU after writing the payload data to the second write cache, if the indication requests the certification. The method also includes the first bus bridge generating an interrupt to the first CPU in response to receiving the certification.

In another aspect, the present invention provides a bus bridge. The bus bridge is configured to be instantiated on each of primary and secondary redundant array of inexpensive disks (RAID) controllers coupled for communication on a PCI-Express link. The bus bridge includes a PCI-Express interface, configured for coupling to the PCI-Express link. The bus bridge also includes a local bus interface, configured for coupling to a CPU of the respective RAID controller. The bus bridge also includes a memory bus interface, configured for coupling to a write cache memory of the respective RAID controller. The bus bridge also includes control logic, coupled to and configured to control the PCI-Express interface, the local bus interface, and the memory bus interface. The primary control logic controls the primary PCI-Express interface to transmit a PCI-Express memory write request transaction layer packet (TLP) on the link. The TLP includes payload data and a header. The header includes an indication of whether a certification is requested by the primary CPU. The certification certifies that the payload data has been written to the secondary write cache memory. The secondary control logic determines whether the indication received by the secondary PCI-Express interface requests the certification, and automatically controls the secondary PCI-Express interface to transmit the certification on the link independent of the secondary CPU, after controlling the secondary memory bus interface to write the payload data to the secondary write cache memory, if the indication requests the certification. The primary control logic controls the local bus interface to generate an interrupt to the primary CPU in response to the primary PCI-Express interface receiving the certification.

DETAILED DESCRIPTION

Figure 1:
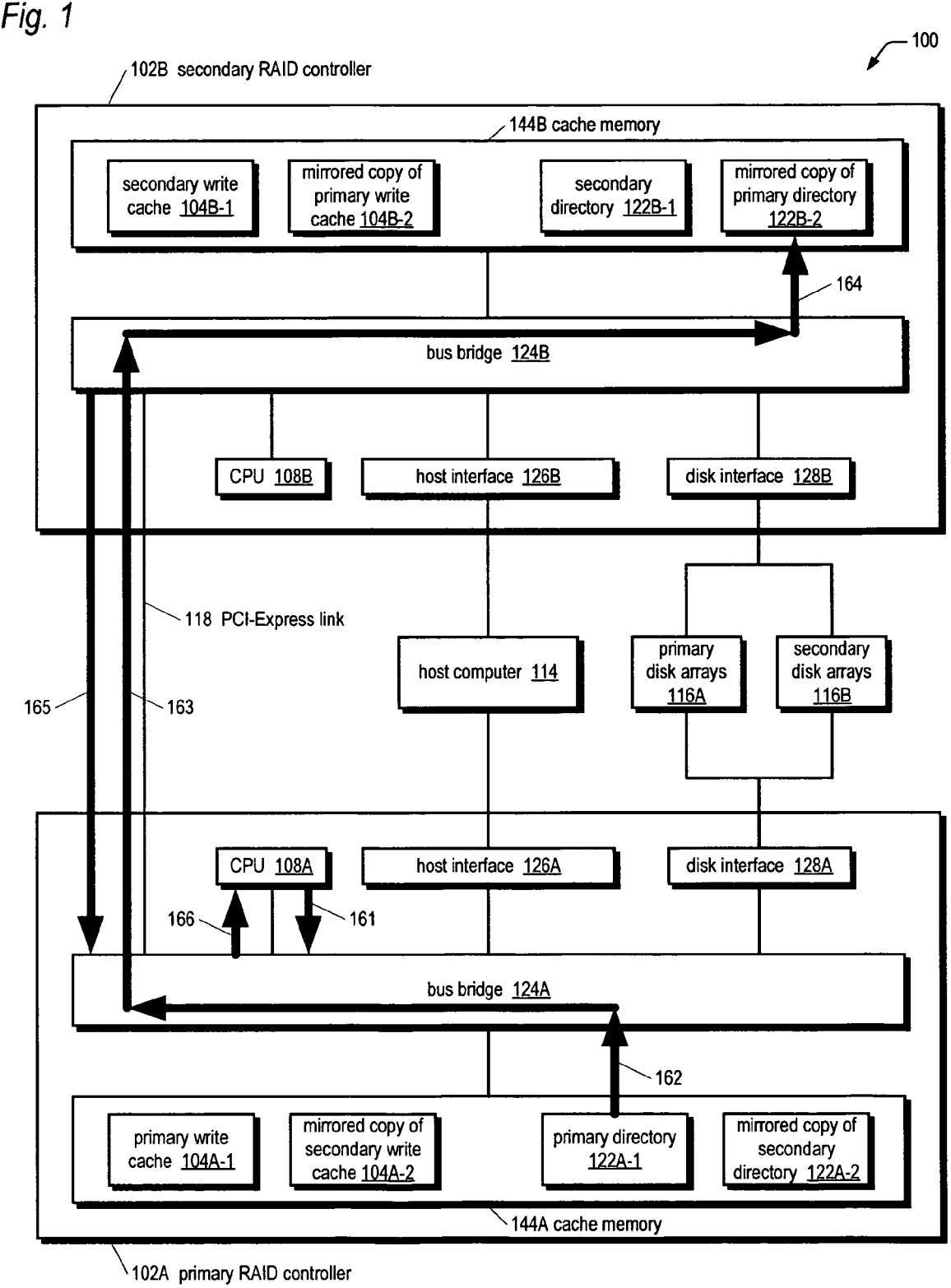
FIG. 1 is a block diagram illustrating an active-active redundant fault-tolerant RAID system according to the present invention.

Referring now to FIG. 1, a block diagram illustrating an active-active redundant fault-tolerant RAID system 100 according to the present invention is shown. The system 100 includes two RAID controllers denoted individually primary RAID controller 102A and secondary RAID controller 102B, generically as RAID controller 102, and collectively as RAID controllers 102. Although the RAID controllers 102 are referred to as primary and secondary, they are symmetric from the perspective that either controller 102 may be failed over to if the other controller 102 fails. The RAID controllers 102 are coupled to one another by a PCI-Express link 118. In one embodiment, the PCI-Express link 118 comprises signal traces on a backplane or mid-plane of a chassis into which the RAID controllers 102 plug. In one embodiment, the RAID controllers 102 are hot-pluggable into the backplane.

The PCI-Express link 118 is an efficient high-speed serial link designed to transfer data between components within a computer system as described in the PCI Express Base Specification Revision 1.0a, Apr. 15, 2003. The PCI Express specification is managed and disseminated through the PCI Special Interest Group (SIG) found at www.pcisig.com. PCI-Express is a serial architecture that replaces the parallel bus implementations of the PCI and PCI-X bus specification to provide platforms with greater performance, while using a much lower pin count. A complete discussion of PCI Express is beyond the scope of this specification, but a thorough background and description can be found in the following books which are incorporated herein by reference for all purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com.

Advantageously, embodiments of the system 100 of the present invention described herein utilize a PCI-Express link 118 to enable redundant fault-tolerant RAID controllers 102 to communicate by sending messages and data to one another. The PCI-Express link 118 used in the system 100 has the following advantages over legacy RAID system communications links such as Fibre Channel and SCSI: higher bandwidth, lower latency, lower cost, built-in error recovery and multiple retry mechanisms, and greater immunity to service interruptions since the link is dedicated for inter-processor communication and inter-memory transfers rather than being shared with other functions such as storage device I/O.

PCI-Express provides a load-store architecture by virtue of its pedigree as a local bus. Consequently, the programming model for PCI-Express controllers is lower level than Fibre Channel or SCSI controllers, which typically provide a relatively high level programming model. In particular, PCI-Express does not provide a primitive for requesting a certified memory write without involving a higher level software function. The present disclosure describes a system 100 and method in which the RAID controllers 102 communicate with one another via the PCI-Express link 118 to transfer data from the memory space of one RAID controller 102 to the memory space of the other RAID controller 102 automatically without involving the destination CPU, and for the requesting CPU to be interrupted upon successful completion of the transfer, as described in detail below.

Each of the RAID controllers 102 of FIG. 1 are identical and will be described generically; however, each element in FIG. 1 includes an A or B suffix on its reference numeral to indicate the element is part of the primary RAID controller 102A or the secondary RAID controller 102B, respectively.

Each RAID controller includes a CPU 108, or processor 108, or processor complex 108. The processor 108 may be any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the processor complex 108 comprises a Transmeta TM8800 processor that includes an integrated North Bridge and an ALi M1563S South Bridge. In another embodiment, the processor 108 comprises an AMD Elan SC-520 microcontroller. In another embodiment, the processor 108 comprises an Intel Celeron M processor and an MCH and ICH. In one embodiment, coupled to the processor 108 is random access memory (RAM) from which the processor 108 executes stored programs. In one embodiment, the code RAM comprises a double-data-rate (DDR) RAM, and the processor 108 is coupled to the DDR RAM via a DDR bus.

A disk interface 128 interfaces the RAID controller 102 to disk drives or other mass storage devices, including but not limited to, tape drives, solid-state disks (SSD), and optical storage devices, such as CDROM or DVD drives. In the embodiment shown in FIG. 1, the disk interface 128 of each of the RAID controllers 102 is coupled to two sets of one or more disk arrays 116, denoted primary disk arrays 116A and secondary disk arrays 116B. The disk arrays 116 store user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, iSCSI, or FICON. The RAID controller 102 reads and writes data from or to the disk drives in response to I/O requests received from host computers such as host computer 114 of FIG. 1 which is coupled to the host interface 126 of each of the RAID controllers 102.

A host interface 126 interfaces the RAID controller 102 with host computers 114. In one embodiment, the RAID controller 102 is a local bus-based controller, such as a controller that plugs into, or is integrated into, a local I/O bus of the host computer system 114, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the RAID controller 102 is a standalone controller in a separate enclosure from the host computers 114 that issue I/O requests to the RAID controller 102. For example, the RAID controller 102 may be part of a storage area network (SAN). In this type of embodiment, the host interface 126 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like.

A bus bridge 124 is coupled to the processor 108. In one embodiment, the processor 108 and bus bridge 124 are coupled by a local bus, such as a PCI, PCI-X, PCI-Express, or other PCI family local bus. Also coupled to the bus bridge 124 are a cache memory 144, the host interface 126, and the disk interface 128. In one embodiment, the cache memory 144 comprises a DDR RAM coupled to the bus bridge 124 via a DDR bus. In one embodiment, the host interface 126 and disk interface 128 comprise PCI-X or PCI-Express devices coupled to the bus bridge 124 via respective PCI-X or PCI-Express buses.

The cache memory 144 is used to buffer messages and data received from the other RAID controller 102 via the PCI-Express link 118. In particular, the software executing on the processor 108 allocates a portion of the cache memory 144 to a plurality of message buffers. The communication of messages between the RAID controllers 102 is described in detail in the above-referenced U.S. patent application Ser. No. 11/178,727 (attorney docket no. CHAP.0125).

In addition, the cache memory 144 is used to buffer, or cache, user data as it is transferred between the host computers and the disk drives via the host interface 126 and disk interface 128, respectively. A portion of the cache memory 144 is used as a write cache 104A/B-1 for holding posted write data until the RAID controller 102 writes, or flushes, the data to the disk arrays 116. Another portion of the cache memory 144 is used as a mirrored copy of the write cache 104A/B-2 on the other RAID controller 102. FIG. 1 illustrates a primary write cache 104A-1 in the primary RAID controller 102A cache memory 144, a secondary write cache 104B-1 in the secondary RAID controller 102B cache memory 144, a mirrored copy of the secondary write cache 104A-2 in the primary RAID controller 102A cache memory 144, and a mirrored copy of the primary write cache 104B-2 in the secondary RAID controller 102B cache memory 144. A portion of the cache memory 144 is also used as a directory 122A/B-1 of entries 602 (described below with respect to FIG. 6) for holding information about the state of each write cache buffer 604 (described below with respect to FIG. 6) in the write cache 104A/B-1, such as the disk array 116 logical block addresses (LBAs) and serial numbers, and valid bits associated with each write cache buffer 604. Another portion of the cache memory 144 is used as a mirrored copy of the directory 122A/B-2 on the other RAID controller 102. FIG. 1 illustrates a primary directory 122A-1 in the primary RAID controller 102A cache memory 144, a secondary directory 122B-2 in the secondary RAID controller 102B cache memory 144, a mirrored copy of the secondary directory 122A-2 in the primary RAID controller 102A cache memory 144, and a mirrored copy of the primary directory 122B-2 in the secondary RAID controller 102B cache memory 144. The layout and use of the cache memory 144, and in particular the write caches 104 and directories 122, is described in more detail below with respect to FIGS. 5 through 9.

The processor 108, host interface 126, and disk interface 128, read and write data from and to the cache memory 144 via the bus bridge 124. The processor 108 executes programs that control the transfer of data between the disk arrays 116 and the host 114. The processor 108 receives commands from the host 114 to transfer data to or from the disk arrays 116. In response, the processor 108 issues commands to the disk interface 128 to accomplish data transfers with the disk arrays 116. Additionally, the processor 108 provides command completions to the host 114 via the host interface 126. The processor 108 also performs storage controller functions such as RAID control, logical block translation, buffer management, and data caching.

In the embodiment shown in FIG. 1, the disk interface 128 of each of the RAID controllers 102 is coupled to two sets of one or more disk arrays 116, denoted primary disk arrays 116A and secondary disk arrays 116B. Normally, the primary RAID controller 102A controls the primary disk arrays 116A, and the secondary RAID controller 102B controls the secondary disk arrays 116B. However, in the event of a failure of the primary RAID controller 102A, the system 100 fails over to the secondary RAID controller 102B to control the primary disk arrays 116A; conversely, in the event of a failure of the secondary RAID controller 102B, the system 100 fails over to the primary RAID controller 102A to control the secondary disk arrays 116B. In particular, during normal operation, when a host computer 114 sends an I/O request to the primary RAID controller 102A to write data to the primary disk arrays 116A, the primary RAID controller 102A also broadcasts a copy of the user data to the secondary RAID controller 102B for storage in a cache memory 114B of the secondary RAID controller 102B so that if the primary RAID controller 102A fails before it flushes the user data out to the primary disk arrays 116A, the secondary RAID controller 102B can subsequently flush the user data out to the primary disk arrays 116A. Conversely, when a host computer 114 sends an I/O request to the secondary RAID controller 102B to write data to the secondary disk arrays 116B, the secondary RAID controller 102B also broadcasts a copy of the user data to the primary RAID controller 102A for storage in a cache memory 114A of the primary RAID controller 102A so that if the secondary RAID controller 102B fails before it flushes the user data out to the secondary disk arrays 116B, the primary RAID controller 102A can subsequently flush the user data out to the secondary disk arrays 116B.

Before describing how the RAID controllers 102 communicate to maintain synchronization of their write caches 104 and directories 122, an understanding of another possible synchronization method is useful. As stated above, in a mirrored posted-write operation, the user data is written to the write cache of both RAID controllers. This may be accomplished by various means. One is simply to have the host computer write the data to each of the RAID controllers. However, this may be a relatively inefficient, low performance solution. An alternative is for the host computer to write the data to only one of the RAID controllers, and then have the receiving RAID controller write, or broadcast, a copy of the data to the other RAID controller. The above-referenced U.S. patent application Ser. No. 10/368,688 (attorney docket no. CHAP.0101) describes such a system that efficiently performs a broadcast data transfer to a redundant RAID controller. However, application Ser. No. 10/368,688 does not describe in detail how the two RAID controllers communicate to maintain synchronization between the two write caches.

One method of maintaining write cache synchronization that could be employed in the broadcasting mirrored posted-write system 100 of FIG. 1 is as follows. Broadly speaking, a three-step process could be employed to keep the mirrored copy of the primary directory 122B-2 synchronized with the primary directory 122A-1 when the primary RAID controller 102A receives an I/O write request from the host computer 114. The first step is for the primary CPU 108A to allocate the necessary write cache buffers 604 in the primary write cache 104A-1, invalidate them in the primary directory 122A-1, and send a message to the secondary CPU 108B instructing it to invalidate the corresponding mirrored copy of the primary write cache 104B-2 write cache buffers 604 in the mirrored copy of the primary directory 122B-2. The primary CPU 108A may send the message via the messaging system described in the above-referenced U.S. patent application Ser. No. 11/178,727 (attorney docket no. CHAP.0125). In more conventional systems without a PCI-Express link 118 to enable communication between the primary CPU 108A and secondary CPU 108B, the primary CPU 108A sends the message via other communications links, such as SCSI or FibreChannel. Employing the PCI-Express link 118 in the system 100 has the following advantages over conventional RAID systems: higher bandwidth, lower latency, lower cost, built-in error recovery and multiple retry mechanisms, and greater immunity to service interruptions since the link is dedicated for inter-processor communication rather than being shared with other functions such as storage device I/O, as discussed in U.S. patent application Ser. No. 11/178,727.

Once the secondary CPU 108B performs the invalidation and informs the primary CPU 108A that it performed the invalidation, the primary CPU 108A performs the second step of programming the primary host interface 126A to transfer the user data from the host computer 114 to the primary write cache 104A-1 via the primary bus bridge 124A. The primary bus bridge 124A in response writes the user data into the primary write cache 104A-1 and broadcasts a copy of the user data to the secondary RAID controller 102B, which writes the user data into the mirrored copy of the primary write cache 104B-2.

Once the primary host interface 126A informs the primary CPU 108A that the user data has been written, the primary CPU 108A performs the third step of sending a message to the secondary CPU 108B instructing it to update the mirrored copy of the primary directory 122B-2 with the destination primary disk array 116A serial number and logical block address and to validate in the mirrored copy of the primary directory 122B-2 the write cache buffers 604 written in the second step. Once the secondary CPU 108B performs the validation and informs the primary CPU 108A that it performed the validation, the primary CPU 108A informs the host computer 114 that the I/O write request is successfully completed.

It is imperative that the first step of invalidating the directories 122 must be performed prior to writing the user data into the destination write cache buffers 604; otherwise, data corruption may occur. For example, assume the user data was written before the invalidation step, i.e., while the directory 122 still indicated the destination write cache buffers 604 were valid, and the primary RAID controller 102A failed before all the data was broadcasted to the mirrored copy of the primary write cache 104B-2. When the system 100 fails over to the secondary RAID controller 102B, the secondary RAID controller 102B would detect that the write cache buffers 604 were valid and flush the partial data to the appropriate primary disk array 116A, causing data corruption.

As may be observed from the foregoing, the three-step process described above has the disadvantage of being inefficient, particularly because it consumes a relatively large amount of the primary CPU 108A and secondary CPU 108B bandwidth in exchanging messages and requiring the secondary CPU 108B to invalidate and validate the mirrored copy of the primary directory 122B-2, which may reduce the performance of the system 100, such as by reducing the maximum number of mirrored posted-write operations per second that may be performed. Additionally, it adds latency to the mirrored posted-write operation since, for example, the secondary CPU 108B must take an interrupt in response to the invalidate message from the primary CPU 108A and invalidate the mirrored copy of the primary directory 122B-2 and conversely take an interrupt in response to the validate message from the primary CPU 108A and validate the mirrored copy of the primary directory 122B-2, which may also reduce the performance of the system 100, such as by reducing the maximum number of mirrored posted-write operations per second that may be performed.

To solve this problem, embodiments of the system described in the above-referenced U.S. patent application Ser. No. 11/272,340 (attorney docket no. CHAP.0126) effectively combine the first and second steps, such that the secondary bus bridge writes the broadcasted copy of the user data to the mirrored copy of the primary write cache 104B-2, but beforehand automatically invalidates the destination write cache buffers 604 in the mirrored copy of the primary directory 122B-2, thereby alleviating the secondary CPU 108B from having to perform the invalidate step. However, the system described in U.S. patent application Ser. No. 11/272,340 requires the bus bridge 124 to have knowledge of the structure of the directory 122 and its location in the cache memory 144.

Advantageously, the embodiments of the system 100 of the present invention described herein enable the bus bridge 124 to be agnostic regarding the structure and location of the directory 122, and yet still reduce the amount of involvement of the CPUs 108 in the performance of the mirrored posted-write operation. In particular, the bus bridges 124 are configured to enable the primary CPU 108A to request a certified memory-to-memory transfer of relevant portions of the directory 122 during the first step (validate) and third step (invalidate), thereby alleviating the secondary CPU 108B from any involvement therein, as described in detail below.

FIG. 1 illustrates, via the numbered thick black arrows, a portion of the data flow of a mirrored posted-write operation according to the present invention, which is described in more detail below with respect to FIGS. 7 and 8 and alternate embodiments thereof. The numbers on the thick black arrows effectively correspond to like-numbered blocks of FIG. 8. In particular, the thick black arrows illustrate a certified memory-to-memory transfer operation from the primary cache memory 144A to the secondary cache memory 144B, that advantageously does not require any involvement of the secondary CPU 108B.

The primary CPU 108A commands the primary bus bridge 124A to perform a certified memory-to-memory transfer operation at arrow 161. The primary bus bridge 124A reads the data specified by the command (such as one or more entries 602 of the primary directory 122A-1) from the primary cache memory 144A at arrow 162. The primary bus bridge 124A transmits the data on the PCI-Express link 118 to the secondary bus bridge 124B at arrow 163. The secondary bus bridge 124B writes the data to the secondary cache memory 144B at arrow 164. Next, the secondary bus bridge 124B automatically, without involvement or knowledge by the secondary CPU 108B, transmits a delivery certification to the primary bus bridge 124A to certify that the data has been successfully written to the secondary cache memory 144B at arrow 165. The primary bus bridge 124A generates an interrupt request to the primary CPU 108A to indicate reception of the delivery certification at arrow 166. Advantageously, the secondary bus bridge 124 automatically transmits the delivery certification after writing the data to the secondary cache memory 144B, and does so independent of the secondary CPU 108B, thereby effectively eliminating the disadvantages described above in the three-step process.

Figure 2:
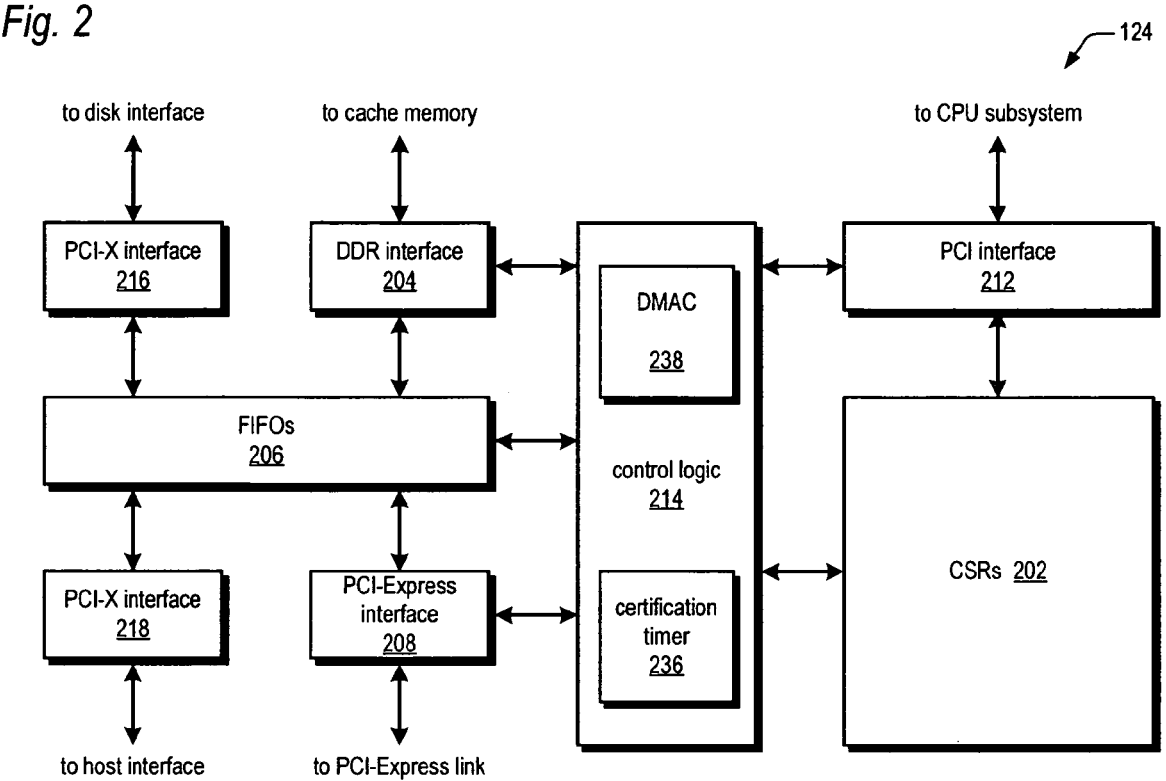
FIG. 2 is a block diagram illustrating in more detail the bus bridge of FIG. 1 according to the present invention.

Referring now to FIG. 2, a block diagram illustrating in more detail the bus bridge 124 of FIG. 1 according to the present invention is shown. The bus bridge 124 includes control logic 214 for controlling various portions of the bus bridge 124. The control logic 214 includes a direct memory access controller (DMAC) 238 that is programmable by the CPU 108 to perform a direct memory data transfer from one location in the cache memory 144 to a second location in the cache memory 144. Additionally, the CPU 108 may program the DMAC 238 to perform a direct memory data transfer from one location in the primary RAID controller 102A cache memory 144 to a location in the secondary RAID controller 102B cache memory 144, and vice versa, via the PCI-Express link 118, which is useful, among other things, for communicating data, including messages, between the two RAID controllers 102, as described in the above-referenced U.S. patent application Ser. No. 11/178,727 (attorney docket no. CHAP.0125). However, the data transfer method described in U.S. patent application Ser. No. 11/178,727 requires involvement by the secondary CPU 108B. Advantageously, the present disclosure describes embodiments in which the primary and secondary bus bridges 124 perform a certified DMA transfer from the primary cache memory 144A to the secondary cache memory 144B to alleviate the need for involvement by the secondary CPU 108B.

In one embodiment, the DMAC 238 is capable of transferring a series of physically discontiguous data chunks whose memory locations are specified by a scatter/gather list whose base address the processor 108 programs into an address register. The DMAC 238 uses the scatter/gather list address/length pairs to transmit multiple PCI-Express memory write request transaction layer packets (TLPs) including data chunks over the PCI-Express link 118 to the cache memory 144 of the other RAID controller 102.

The bus bridge 124 also includes a certification timer 236. The control logic 214 starts the certification timer 236 running with a predetermined time whenever the bus bridge 124 transmits a PCI-Express memory write request TLP 400 of FIG. 4A on the PCI-Express link 118 which has the CERTIFY flag 406 set. In one embodiment, the predetermined time is 30 seconds. In another embodiment, the predetermined time is 100 milliseconds. Other embodiments are contemplated with other timeout values adapted to the application and needs of the system 100. If the certification timer 236 expires before the bus bridge 124 receives a corresponding delivery certificate (PCI-Express memory write request TLP 401 of FIG. 4B which has the DELIVERED flag 408 set) on the PCI-Express link 118 from the other bus bridge 124, then the bus bridge 124 generates an interrupt request to the CPU 108. Prior to generating the interrupt request, the bus bridge 124 populates one or more status registers of control and status registers (CSRs) 202 of the bus bridge 124 to indicate the cause of the interrupt. The CSRs 202 are coupled to the local bus interface 212 and to the control logic 214. The CSRs 202 are programmable by the CPU 108 of FIG. 1 to control the bus bridge 124 and are readable by the CPU 108 for the bus bridge 124 to provide status to the CPU 108. The CSRs 202 also include registers for the CPU 108 to program the DMAC 238.

The bus bridge 124 also includes a local bus interface 216 (such as a PCI-X interface) for interfacing the bus bridge 124 to the disk interface 128; another local bus interface 218 (such as a PCI-X interface) for interfacing the bus bridge 124 to the host interface 126; a memory bus interface 204 (such as a DDR SDRAM interface) for interfacing the bus bridge 124 to the cache memory 144; and a PCI-Express interface 208 for interfacing the bus bridge 124 to the PCI-Express link 118. The local bus interfaces 216 and 218, memory bus interface 204, and PCI-Express interface 208 are all coupled to the control logic 214 and are also coupled to buffers 206 (such as first-in-first-out (FIFO) buffers) that buffer data transfers between the various interfaces and provide parallel high-speed data paths there between. The bus bridge 124 also includes a local bus interface 212, such as a PCI interface, coupled to the control logic 214, for interfacing the bus bridge 124 to the CPU 108. The CPU 108 accesses the cache memory 144, disk interface 128, and host interface 126 via the PCI interface 212.

The PCI-Express interface 208 performs the PCI-Express protocol on the PCI-Express link 118, including transmitting and receiving PCI-Express packets, such as PCI-Express TLPs and data link layer packets (DLLPs), and in particular memory write request TLPs, as described in more detail below with respect to FIGS. 3 and 4. In one embodiment, with the exception of the CERTIFY flag 406, DELIVERED flag 408, and related functional modifications described herein, the PCI-Express interface 208 substantially conforms to relevant portions of the PCI Express Base Specification Revision 1.0a, Apr. 15, 2003.

Figure 3:
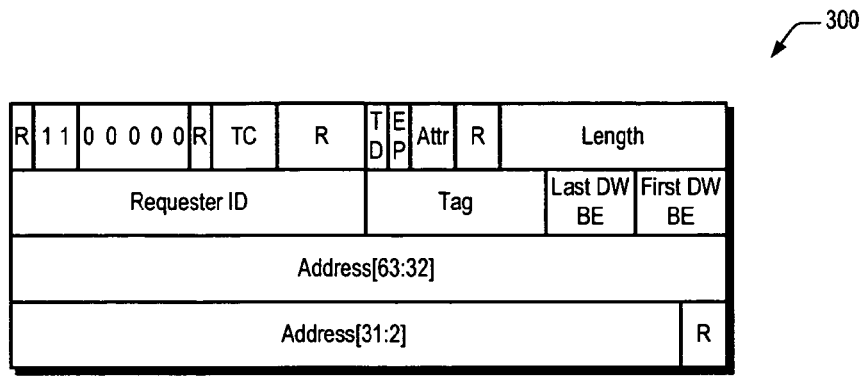
FIG. 3 is a block diagram illustrating a prior art PCI-Express memory write request transaction layer packet (TLP) header.

Referring now to FIG. 3, a block diagram illustrating a prior art PCI-Express memory write request transaction layer packet (TLP) header 300 is shown. The packet header 300 of FIG. 3 illustrates a standard four double word header with data format memory write request TLP header as specified by the current PCI Express Base Specification Revision 1.0a, Apr. 15, 2003. The header 300 includes four 32-bit double words. The first double word includes, from left to right: a reserved bit (R); a Boolean 11 value in the Format field denoting that the TLP header is four double word header with data format TLP; a Boolean 00000 value in the Type field to denote that the TLP includes a memory request and address routing is to be used; a reserved bit (R); a 3-bit Transaction Class (TC) field; four reserved bits (R); a TLP Digest bit (TD); a poisoned data (EP) bit; two Attribute (Attr) bits; two reserved bits (R); and ten Length bits specifying the length of the data payload. The second double word includes, from left to right: a 16 bit Requester ID field; a Tag field; a Last double word byte enable (DW BE) field; and a First double word byte enable (DW BE) field. The third double word includes a 32-bit Address field which specifies bits 63:32 of the destination memory address of the data payload. The fourth double word includes a 30-bit Address field which specifies bits 31:2 of the destination memory address of the data payload, followed by two reserved (R) bits.

Figure 4A:
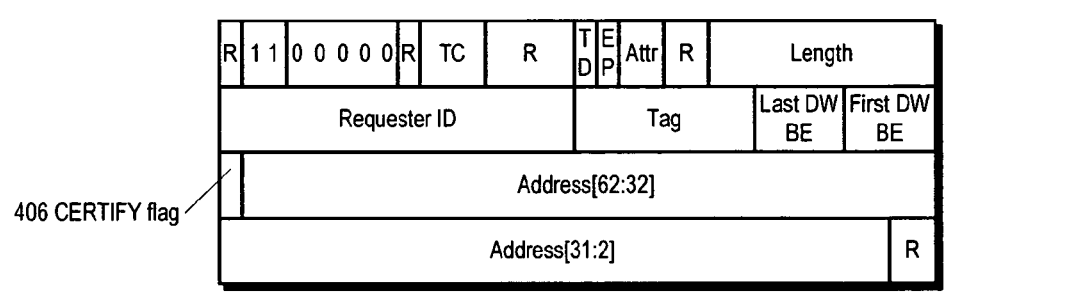
FIG. 4A is a block diagram illustrating a modified PCI-Express memory write request transaction layer packet (TLP) header for transferring data whose transfer is certified according to the present invention.

Referring now to FIG. 4A, a block diagram illustrating a modified PCI-Express memory write request transaction layer packet (TLP) header 400 for transferring data whose transfer is certified according to the present invention is shown. The modified TLP packet header 400 is similar to the standard TLP packet header 300 of FIG. 3; however, the modified TLP packet header 400 includes a CERTIFY flag 406 that occupies bit 63 of the Address field. The Address field bit occupied by the CERTIFY flag 406 is not interpreted by the bus bridge 124 as part of the Address field. Rather, the Address field is shortened relative to the standard PCI-Express TLP header 300 of FIG. 3. Thus, the modified TLP packet header 400 of FIG. 4 reduces the memory address space that may be accessed by the RAID controllers 102 in the other RAID controller 102 in exchange for the capability to transfer data from the primary cache memory 144A to the secondary cache memory 144B using a TLP in a certified manner without involving the secondary CPU 108B. A set CERTIFY flag 406 instructs the receiving bus bridge 124 to transmit a delivery certification (such as a memory write request TLP with a header 401 of FIG. 4B) to the transmitting bus bridge 124 after the receiving bus bridge 124 successfully writes the payload data of the received memory write request TLP to its cache memory 144.

Although FIG. 4A illustrates using a particular bit of the Address field for the CERTIFY flag 406, the invention is not limited to the particular bit; rather, other bits may be used. For example, although embodiments have been described in which the CERTIFY flag 406 bit is the highest bit in the address field of the TLP header, other bits of the address field may be used for the CERTIFY flag 406. Additionally, although embodiments are shown in which the TLP has a 4 double word header with data format, address bits in a 3 double word header with data format TLP may be used for the CERTIFY flag 406 if the amount of cache memory to be addressed is small enough to be addressed by 32 bits less one bit for the CERTIFY flag 406. What is important is that the bit used for the CERTIFY flag 406 is a bit in the address field that is not needed for addressing memory in the receiving RAID controller and that the bit chosen be predetermined so that the PCI-Express controller may be configured to interpret the predetermined bit as the CERTIFY flag 406.

Furthermore, other embodiments are contemplated in which the CERTIFY flag 406 is located in unneeded bits of fields of the TLP header other than the address field. For example, one or more of the reserved fields in the TLP header could be used for the CERTIFY flag 406 bit. For another example, the system designer could decide not to support data poisoning and utilize the EP bit in the TLP header as the CERTIFY flag 406. Similarly, the system designer could decide not to support TLP digests and utilize the TD bit in the TLP header as the CERTIFY flag 406. Similarly, the system designer could decide not to support differentiated service classes or to support only a subset thereof and utilize the surplus TC bits in the TLP header as the CERTIFY flag 406. Similarly, the system designer could decide not to support relaxed ordering and/or hardware coherency management and utilize one or both of the attribute bits in the TLP header as the CERTIFY flag 406. Similarly, the system designer could decide to require data transfers to be located on dword boundaries and utilize the bits in one or both of the byte enable fields of the TLP header as the CERTIFY flag 406. Similarly, the system designer could decide to support less than the maximum number of outstanding requests and utilize unneeded bits in the tag field and/or function number field of the transaction ID of the TLP header as the CERTIFY flag 406. Again, what is important is that the bits used for the CERTIFY flag 406 that are not needed for standard PCI-Express functions and that the bits chosen be predetermined so that the PCI-Express controller may be configured to interpret the predetermined bits as the CERTIFY flag 406.

Figure 4B:
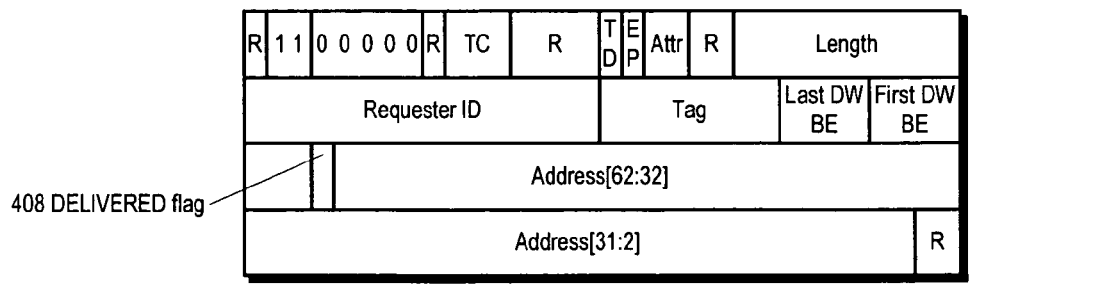
FIG. 4B is a block diagram illustrating a modified PCI-Express memory write request transaction layer packet (TLP) header for use as a delivery certificate according to the present invention.

Referring now to FIG. 4B, a block diagram illustrating a modified PCI-Express memory write request transaction layer packet (TLP) header 401 for use as a delivery certificate according to the present invention is shown. The modified TLP packet header 401 is similar to the standard TLP packet header 300 of FIG. 3; however, the modified TLP packet header 400 includes a DELIVERED flag 408 that occupies bit 60 of the Address field. The Address field bit occupied by the DELIVERED flag 408 is not interpreted by the bus bridge 124 as part of the Address field. Rather, the Address field is shortened relative to the standard PCI-Express TLP header 300 of FIG. 3. Thus, the modified TLP packet header 401 of FIG. 4B reduces the memory address space that may be accessed by the RAID controllers 102 in the other RAID controller 102 in exchange for the capability to transfer data from the primary cache memory 144A to the secondary cache memory 144B using a TLP in a certified manner without involving the secondary CPU 108B. A set DELIVERED flag 408 instructs the receiving bus bridge 124 that the transmitting bus bridge 124 has successfully written the payload data of a previously transmitted memory write request TLP to its cache memory 144 and to interrupt its CPU 108 to indicate the same.

Although FIG. 4B illustrates using a particular bit of the Address field for the DELIVERED flag 408, the invention is not limited to the particular bit; rather, other bits may be used in ways similar to those described above with respect to the TLP packet header 400 of FIG. 4A. Furthermore, various other embodiments of the delivery certificate are contemplated, including but not limited to, a PCI-Express Vendor-defined Message packet or a Message Signaled Interrupt (MSI) packet. What is important is that the certified memory-to-memory transfer method described herein does not require involvement by the secondary CPU 108B, regardless of the form of the delivery certificate, because the secondary bus bridge 124B automatically transmits the delivery certificate in response to the CERTIFY flag 406 independent of the secondary CPU 108B. It is noted that the embodiment of FIG. 4B has the advantage of requiring fewer logic gates because in one embodiment although the bus bridge 124 employs logic to perform transmission and reception of PCI-Express memory write request TLPs, it is not required to implement the full PCI-Express protocol, such as, for example PCI-Express Message packets and/or I/O request packets.

Figure 5:
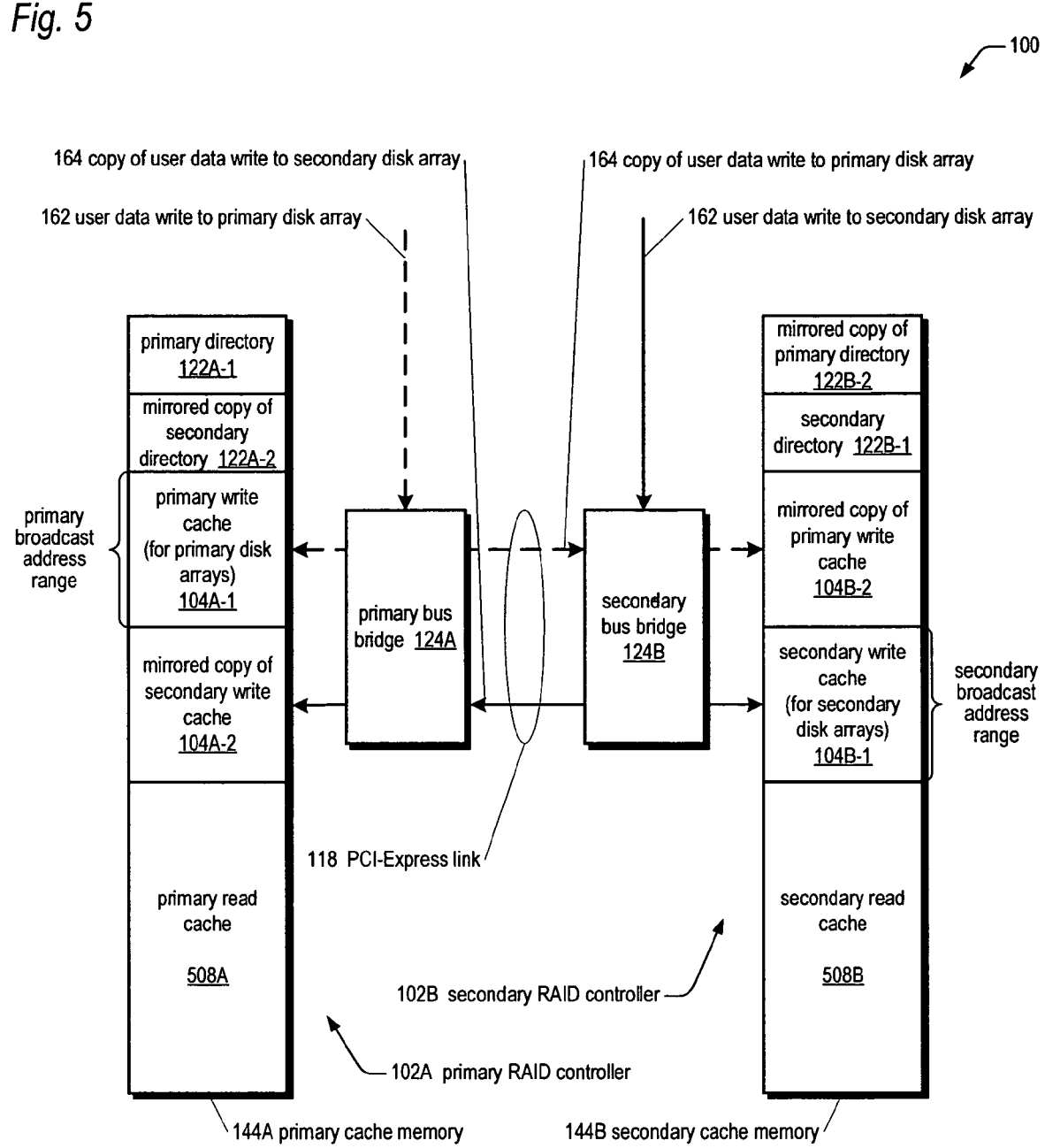
FIG. 5 is a block diagram illustrating the configuration of mirrored cache memories in the two RAID controllers of the system of FIG. 1 according to the present invention.

Referring now to FIG. 5, a block diagram illustrating the configuration of mirrored cache memories 144 in the two RAID controllers 102 of the system 100 of FIG. 1 according to the present invention is shown. FIG. 5 illustrates the primary cache memory 144A coupled to the primary bus bridge 124A, and the secondary cache memory 144B coupled to the secondary bus bridge 124B, and the primary and secondary bus bridges 124 coupled via the PCI-Express link 118, all of FIG. 1.

The primary cache memory 144A includes the primary directory 122A-1, the mirrored copy of the secondary directory 122A-2, the primary write cache 104A-1, and the mirrored copy of the secondary write cache 104A-2, of FIG. 1. The primary cache memory 144A also includes a primary read cache 508A. The primary read cache 508A is used to cache data that has been read from the disk arrays 116 in order to quickly provide the cached data to a host computer 114 when requested thereby without having to access the disk arrays 116 to obtain the data. The secondary cache memory 144B includes the mirrored copy of the primary directory 122B-2, the secondary directory 122B-1, the mirrored copy of the primary write cache 104B-2, and the secondary write cache 104B-1, of FIG. 1. The secondary cache memory 144B also includes a secondary read cache 508B. The secondary read cache 508B is used to cache data that has been read from the disk arrays 116 in order to quickly provide the cached data to a host computer 114 when requested thereby without having to access the disk arrays 116 to obtain the data.

The write caches 104 are used to buffer data received by the RAID controller 102 from a host computer 114 until the RAID controller 102 writes the data to the disk arrays 116. In particular, during a posted-write operation, once the host computer 114 data has been written to write cache buffers 604 of the write cache 104, the RAID controller 102 sends good completion status to the host computer 114 to indicate that the data has been successfully written.

The primary write cache 104A-1 is used by the primary RAID controller 102A for buffering data to be written to the primary disk arrays 116A and the secondary write cache 104B-1 is used by the secondary RAID controller 102B for buffering data to be written to the secondary disk arrays 116B. As mentioned above, during normal operation (i.e., when both the primary and secondary RAID controllers 102 are operating properly such that there has been no failover to the other RAID controller 102), the primary RAID controller 102A controls the primary disk arrays 116A, and the secondary RAID controller 102B controls the secondary disk arrays 116B. Thus, during normal operation, the primary RAID controller 102A only receives I/O requests to access the primary disk arrays 116A from the host computer 114, and the secondary RAID controller 102B only receives I/O requests to access the secondary disk arrays 116B from the host computer 114. As shown in FIG. 5, user data 162 received by the primary bus bridge 124A destined for a primary disk array 116A is written into the primary write cache 104A-1, and user data 162 received by the secondary bus bridge 124B destined for a secondary disk array 116B is written into the secondary write cache 104B-1.

Additionally, the primary write cache 104A-1 is within an address range designated as a primary broadcast address range. If the primary bus bridge 124A receives a transaction from the primary host interface 126A specifying an address within the primary broadcast address range, the primary bus bridge 124A not only writes the user data 162 to the primary write cache 104A-1, but also broadcasts a copy of the user data 164 to the secondary bus bridge 124B via the PCI-Express link 118. In response, the secondary bus bridge 124B writes the copy of the user data 164 to the mirrored copy of the primary write cache 104B-2. Consequently, if the primary RAID controller 102A fails, the copy of the user data 164 is available in the mirrored copy of the primary write cache 104B-2 so that the secondary RAID controller 102B can be failed over to and can subsequently flush the copy of the user data 164 out to the appropriate primary disk array 116A. Conversely, the secondary write cache 104B-1 is within an address range designated as a secondary broadcast address range. If the secondary bus bridge 124B receives a transaction from the secondary host interface 126B specifying an address within the secondary broadcast address range, the secondary bus bridge 124B not only writes the user data 162 to the secondary write cache 104B-1, but also broadcasts a copy of the user data 164 to the primary bus bridge 124A via the PCI-Express link 118. In response, the primary bus bridge 124A writes the copy of the user data 164 to the mirrored copy of the secondary write cache 104A-2. Consequently, if the secondary RAID controller 102B fails, the copy of the user data 164 is available in the mirrored copy of the secondary write cache 104A-2 so that the primary RAID controller 102A can be failed over to and can subsequently flush the copy of the user data 164 out to the appropriate secondary disk array 1116B. In one embodiment, the bus bridges 124 include control registers in the CSRs 202 that specify the broadcast address range. The CPU 108 may program the broadcast address range into the control registers at RAID controller 102 initialization time. In one embodiment, the RAID controllers 102 communicate at initialization time to exchange their broadcast address range values to facilitate mirroring of the write caches 104.

Figure 6:
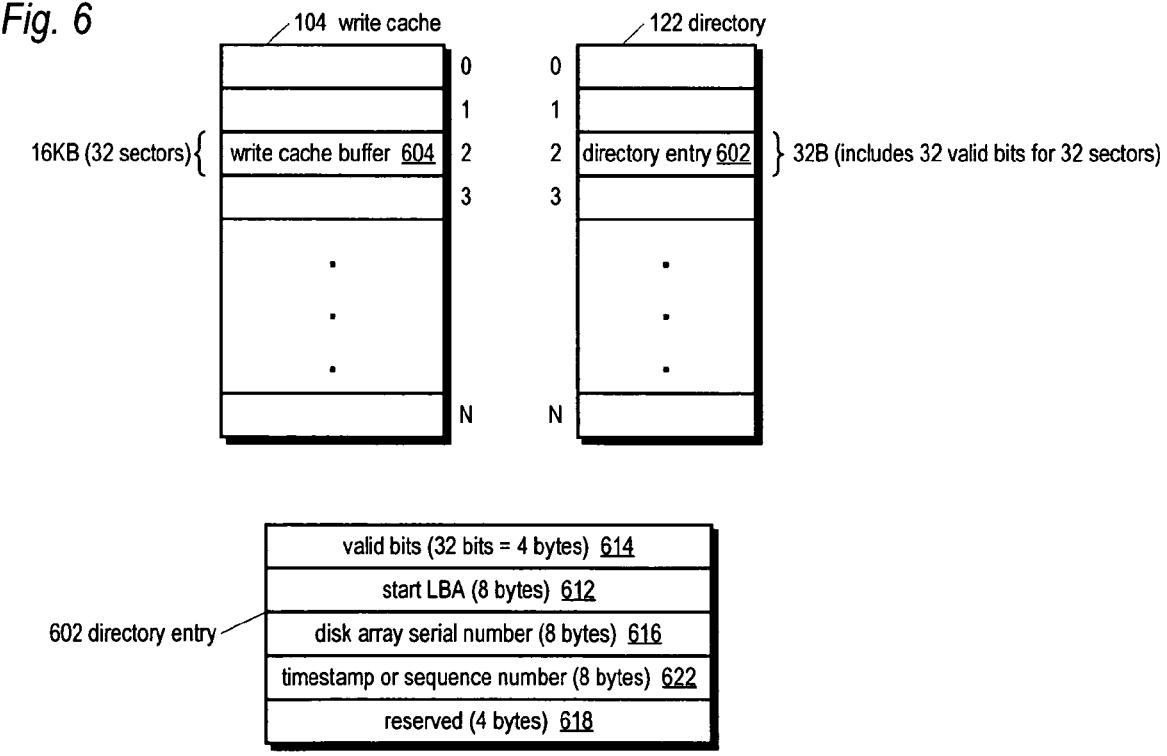
FIG. 6 is a block diagram illustrating the configuration of a write cache and directory of FIG. 1 according to the present invention.

Referring now to FIG. 6, a block diagram illustrating the configuration of a write cache 104 and directory 122 of FIG. 1 according to the present invention is shown. FIG. 6 illustrates only one write cache 104 and one directory 122, although as shown in FIGS. 1 and 5, each RAID controller 102 includes two write caches 104 and two directories 122. The write cache 104 is configured as an array of write cache buffers 604 and the directory 122 is configured as an array of directory entries 602. Each write cache buffer 604 has an array index. The write cache 104 array indices are denoted 0 through N. Each directory entry 602 has an array index. The directory 122 array indices are denoted 0 through N, corresponding to the write cache 104 array indices. In the embodiment of FIG. 6, the size of a write cache buffer 104 is 16 KB, which enables a write cache buffer 104 to store the data for 32 disk sectors (each disk sector being 512 bytes). In the embodiment of FIG. 6, the size of a directory entry 602 is 32 bytes.

In the embodiment of FIG. 6, each directory entry 602 includes a start LBA field 612 that is eight bytes, a valid bits field 614 that is four bytes, a disk array serial number field 616 that is eight bytes, a timestamp or sequence number 622 that is eight bytes, and a reserved field 618 that is four bytes. The disk array serial number field 616 stores a serial number uniquely identifying the disk array 116 to which the data in the write cache buffer 604 is to be written. In one embodiment, the disk array serial number field 616 stores a serial number uniquely identifying a partition of the disk array 116 to which the data in the write cache buffer 604 is to be written. The start LBA field 612 contains the disk array 116 logical block address of the first valid sector of the corresponding write cache buffer 604. There are 32 valid bits in the valid bits field 614: one bit corresponding to each of the 32 sectors in the respective write cache buffer 604. If the valid bit is set for a sector, then the data in the sector of the write cache buffer 604 is valid, or dirty, and needs to be flushed to the disk array 116 by the RAID controller 102 that is failed over to in the event of a failure of the other RAID controller 102. If the valid bit is clear for a sector, then the data in the sector of the write cache buffer 604 is invalid, or clean. In one embodiment, the timestamp or sequence number 622 field stores a value indicating the time when the mirrored posted-write data was written to the write cache 104. In one embodiment, the timestamp or sequence number 622 field stores a value of a counter that is incremented each time the data of a host I/O request is written to the write cache 104. The timestamp or sequence number 622 may be employed to avoid duplicate valid entries 602 in the directories 122 for the same logical block address on a disk array 116, which could otherwise occur because write cache buffers 604 are not invalidated until just prior to their next use.

Figure 7:
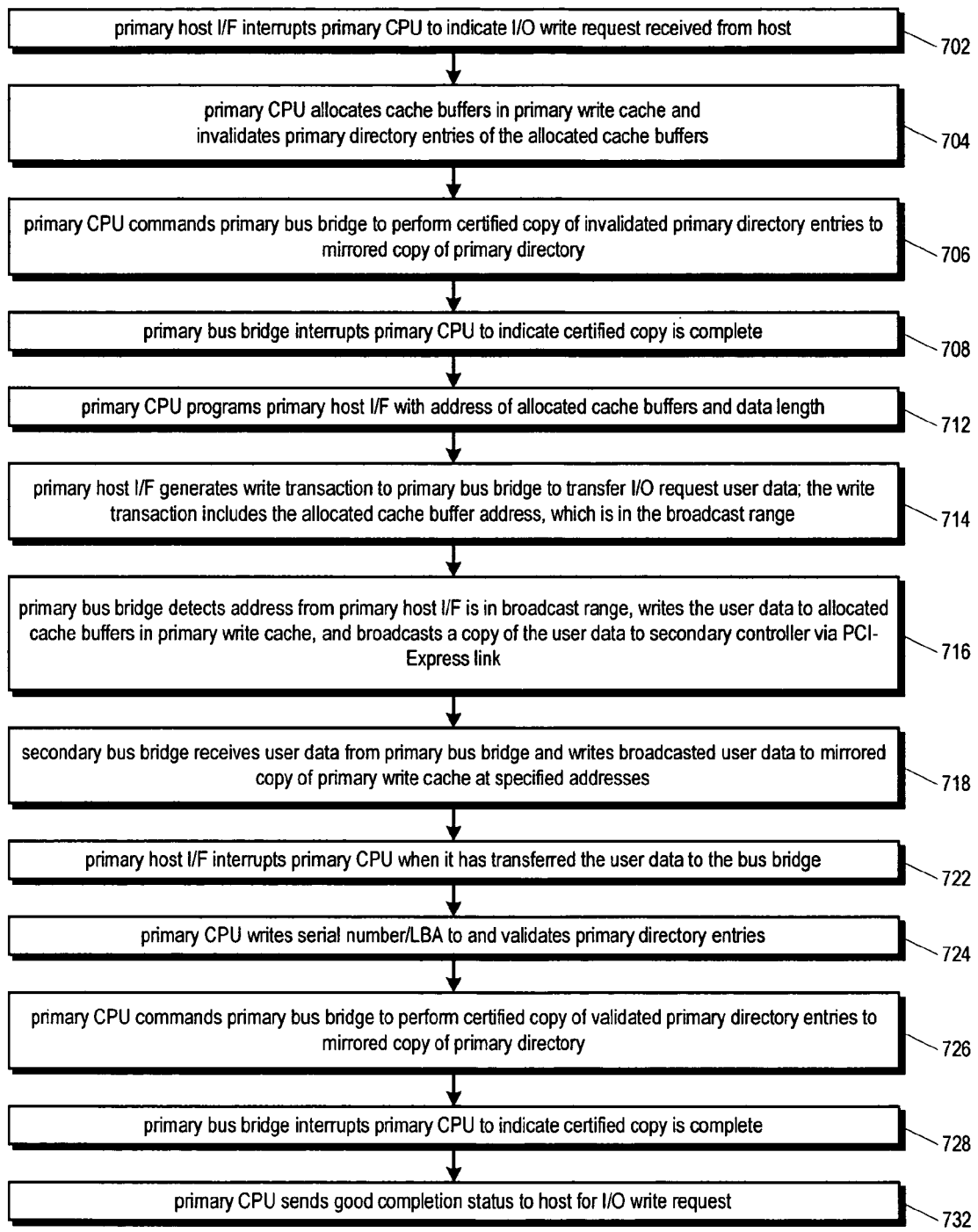
FIG. 7 is a flowchart illustrating operation of the system to perform a mirrored posted-write operation according to one embodiment of the present invention.

Referring now to FIG. 7, a flowchart illustrating operation of the system 100 to perform a mirrored posted-write operation according to one embodiment of the present invention is shown. Flow begins at block 702.

At block 702, the primary host interface 126A receives an I/O request from the host computer 114 and interrupts the primary CPU 108A to notify it of receipt of the I/O request. Flow proceeds to block 704.

At block 704, in response to the interrupt, the primary CPU 108A examines the I/O request and determines the I/O request is a write request. The flowchart of FIG. 7 assumes that write-posting is enabled on the RAID controllers 102. In response, the primary CPU 108A allocates a write cache buffer 604 in the primary write cache 104A-1 and invalidates the allocated write cache buffer 604 by clearing the appropriate valid bits 614 in the corresponding directory entry 602 in the primary directory 122A-1. In one embodiment, the primary CPU 108A also writes the destination primary disk array 116A serial number and logical block address to the directory entry 602 after clearing the valid bits 614. Flow proceeds to block 706.

At block 706, the primary CPU 108A commands the primary bus bridge 124A to perform a certified memory-to-memory transfer to copy the primary directory 122A-1 entry 602 invalidated at block 704 to the corresponding entry 602 in the mirrored copy of the primary directory 122B-2. In particular, the primary CPU 108A programs the DMAC 238 of the primary bus bridge 124A to perform the certified memory-to-memory transfer, as described in detail with respect to block 161 of FIG. 8. Flow proceeds to block 708.

At block 708, the primary bus bridge 124A interrupts the primary CPU 108A to indicate the certified copy requested at block 706 is complete. In particular, the primary bus bridge 124A interrupts the primary CPU 108A, as described in detail with respect to block 166 of FIG. 8. FIG. 8 describes in more detail the operation of the system 100 to perform the validating certified memory-to-memory copy. Flow proceeds to block 712.

At block 712, the primary CPU 108A programs the primary host interface 126A with the memory address of the allocated write cache buffer 604 and length of the data to be written to the write cache buffer 604, which is specified in the I/O write request. In one embodiment, if the amount of data specified in the I/O write request is larger than a single write cache buffer 604 and sufficient physically contiguous write cache buffers 604 are not available, the primary CPU 108A allocates multiple write cache buffers 604 and provides to the primary host interface 126A a scatter/gather list of write cache buffer 604 address/length pairs. Flow proceeds to block 714.

At block 714, the primary host interface 126A generates a write transaction, such as a PCI-X memory write transaction, on the bus coupling the primary host interface 126A to the primary bus bridge 124A to write the user data specified in the I/O request. The write transaction includes the memory address of the write cache buffer 604 allocated at block 704. The memory address is in the primary broadcast address range shown in FIG. 5. Flow proceeds to block 716.

At block 716, the primary bus bridge 124A writes the data specified in the write transaction to the address in the primary write cache 104A-1 specified by the write transaction, namely the address of the write cache buffer 604 allocated at block 704. Additionally, the primary bus bridge 124A detects that the write transaction address is in the primary broadcast address range and broadcasts a copy of the user data to the secondary bus bridge 124B via the PCI-Express link 118. The primary bus bridge 124A performs the broadcast by transmitting a PCI-Express memory write request TLP having a TLP header 300 of FIG. 3. The Address field of the TLP header 300 includes the memory address specified in the memory write transaction generated by the primary host interface 126A and the Length field of the TLP header 300 includes the length specified in the memory write transaction generated by the primary host interface 126A. In one embodiment, if the length of the user data specified in the I/O request is greater than 2 KB, the primary host interface 126A breaks up the data transfer to the primary bus bridge 124A into multiple write transactions each 2 KB or smaller; consequently, the primary bus bridge 124A transmits multiple PCI-Express memory write request TLPs each including 2 KB or less of user data. In this embodiment, the host interface 126 includes 2 KB internal FIFO buffers that buffer the user data received from the host computer 114 for transferring to the write cache 104 via the bus bridge 124. The bus bridge 124 FIFO buffers 206 of FIG. 2 also comprises 2 KB buffers for buffering the user data received from the host interface 126. Furthermore, the bus bridge 124 includes an arbiter, such as a PCI-X arbiter that performs arbitration on the PCI-X bus coupling the host interface 126 to the bus bridge 124. The arbiter is configured to allow the host interface 126 to always generate PCI-X write transactions to the bus bridge 124 on the PCI-X bus that are atomic, that are a minimum of a sector in size (i.e., 512 bytes), and that are a multiple of a sector size. Flow proceeds to block 718.

At block 718, the secondary bus bridge 124B writes the user data from the TLP payload to the secondary cache memory 144B address specified in the TLP header 300 Address, which is the address of the destination write cache buffer 604 in the mirrored copy of the secondary write cache 104A-2. The destination write cache buffer 604 in the mirrored copy of the secondary write cache 104A-2 is the mirrored counterpart of the write cache buffer 104 allocated in the primary write cache 104A-1 at block 704. Flow proceeds to block 722.

At block 722, the primary host interface 126A interrupts the primary CPU 108A once the primary host interface 126A has finished transferring all of the user data to the primary bus bridge 124A. Flow proceeds to block 724.

At block 724, in response to the interrupt generated at block 722, the primary CPU 108A writes the serial number and LBA to the directory entry 602 of the primary directory 122A-1 allocated and invalidated at block 704 (if the serial number and LBA were not written at block 704) and then validates (i.e., sets) the valid bits 614 corresponding to the sectors written at block 716, which are also the valid bits 614 cleared at block 704. In one embodiment, the secondary CPU 108B also populates the timestamp or sequence number 622 of FIG. 6 prior to validating the valid bits 614. The timestamp or sequence number 622 is used to avoid flushing out duplicate valid entries 602 in the directories 122 for the same logical block address on a disk array 116, which could otherwise occur because write cache buffers 604 are not invalidated until just prior to their next use. Flow proceeds to block 726.

At block 726, the primary CPU 108A commands the primary bus bridge 124A to perform a certified memory-to-memory transfer to copy the primary directory 122A-1 entry 602 validated at block 724 to the corresponding entry 602 in the mirrored copy of the primary directory 122B-2. In particular, the primary CPU 108A programs the DMAC 238 of the primary bus bridge 124A to perform the certified memory-to-memory transfer, as described in detail with respect to block 161 of FIG. 8. In one embodiment, the bus bridge 124 is configured such that the transmission of the certified memory-to-memory transfer data is guaranteed to flush the user data written at block 718. Flow proceeds to block 728.

At block 728, the primary bus bridge 124A interrupts the primary CPU 108A to indicate completion of the certified memory-to-memory copy operation requested by the primary CPU 108A at block 726. In particular, the primary bus bridge 124A interrupts the primary CPU 108A, as described in detail with respect to block 166 of FIG. 8. FIG. 8 describes in more detail the operation of the system 100 to perform the invalidating certified memory-to-memory copy. Flow proceeds to block 732.

At block 732, the primary CPU 108A, in response to the certified copy complete interrupt generated at block 728, commands the primary host interface 126A to send good completion status to the host computer 114 for the I/O write request. Subsequently, at an opportune time, the primary RAID controller 102A flushes the posted-write data out to the appropriate disk array 116. Flow ends at block 732.

Figure 8:
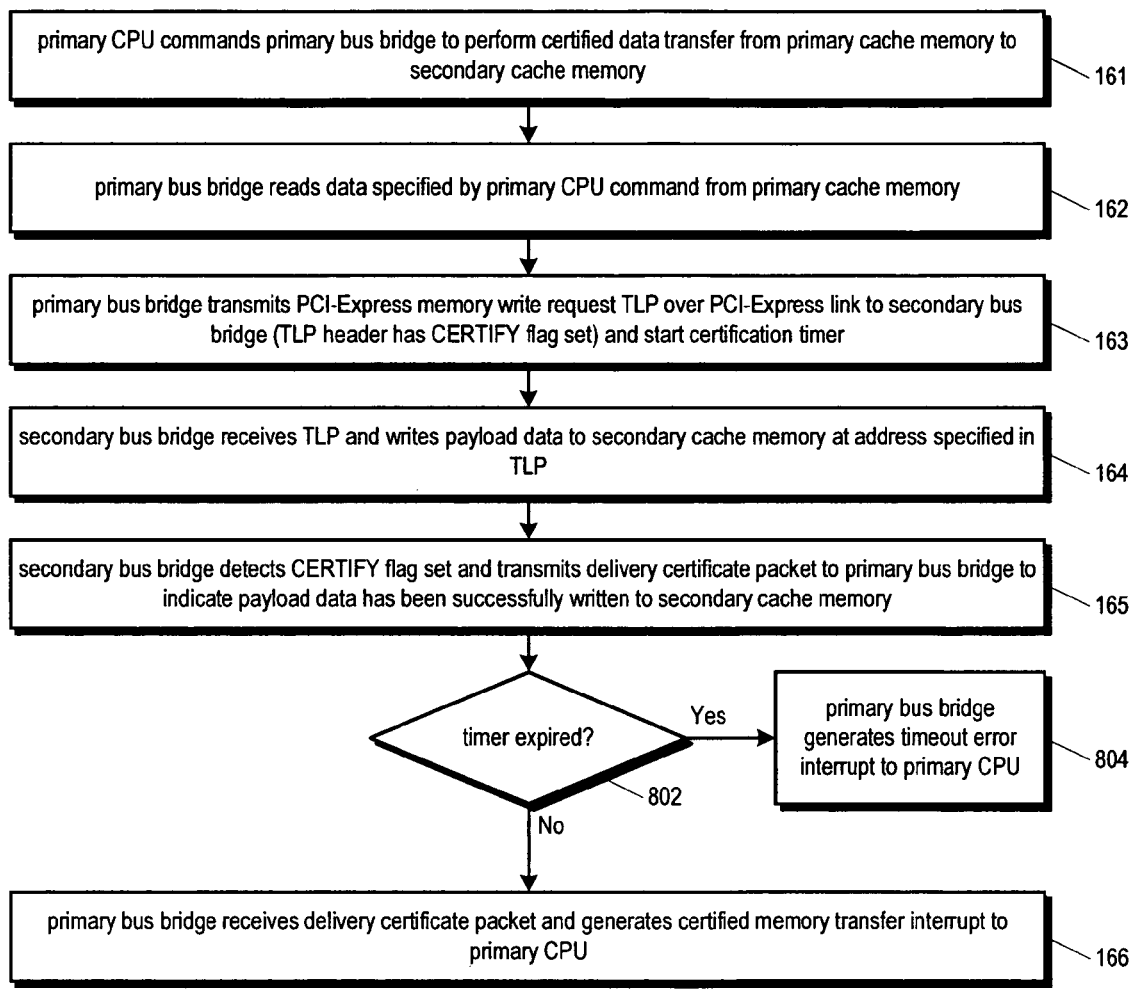
FIG. 8 is a flowchart illustrating operation of the system to perform a certified memory-to-memory transfer operation according to one embodiment of the present invention.

Referring now to FIG. 8, a flowchart illustrating operation of the system 100 to perform a certified memory-to-memory transfer operation according to one embodiment of the present invention is shown. As mentioned above, the numbers on the thick black arrows of FIG. 1 effectively correspond to like-numbered blocks of FIG. 8. Flow begins at block 161.

At block 161, the primary CPU 108A programs the primary bus bridge 124A to perform a certified data transfer from the primary cache memory 144A to the secondary cache memory 144B. In one embodiment, the primary CPU 108A programs a CSR 202 of the DMAC 238 with the address of a scatter/gather list. In one embodiment, the scatter/gather list is located in the primary cache memory 144A. In another embodiment, the scatter/gather list is located in a memory of the CPU complex 108A used for storing program code and data used by the CPU 108A, such as the code RAM referred to above with respect to FIG. 1. The scatter/gather list comprises a list of elements. Each element specifies a memory address of the data to be transferred and the length of the data. The memory address specifies the source address of the data in the primary cache memory 144A and also specifies the destination address of the data in the secondary cache memory 144B, since the transfer is a mirrored transfer. In one embodiment, a scatter/gather list element includes both a source and destination address. The scatter/gather list elements also include control information, such as a flag indicating whether the element is the last element in the list. The control information also includes a flag indicating whether the memory-to-memory transfer is a certified transfer to instruct the bus bridge 124 that the memory-to-memory data transfer described by the scatter/gather list requires a delivery certificate indicating that the transfer completed successfully. In one embodiment, the primary CPU 108A sets the certification flag in the last element of the scatter/gather list. Flow proceeds to block 162.

At block 162, the primary bus bridge 124A reads from the primary cache memory 144A the data specified by the primary CPU 108A command at block 161. The data may be a directory entry 602, such as described with respect to blocks 706 or 726 of FIG. 7, or may be any other data that the primary CPU 108A desires to write to the secondary cache memory 144B in a certified manner and without involvement by the secondary CPU 108B. Flow proceeds to block 163.

At block 163, the primary bus bridge 124A transmits a PCI-Express memory write request TLP over the PCI-Express link 118 to the secondary bus bridge 124B. In particular, the TLP has a header 400 according to FIG. 4A and has the CERTIFY flag 406 set. As discussed above, the command issued at block 161 from the primary CPU 108A to the primary bus bridge 124A may include a scatter/gather list with more than one element, thus describing multiple discontiguous chunks of data. This is particularly useful if the certified memory-to-memory transfer is used to transfer data other than a directory entry 602 (which is typically contiguous), such as RAID 5 parity data logs. In this case, the primary bus bridge 124A transmits multiple PCI-Express memory write request TLPs, i.e., one for each data chunk specified by each respective scatter/gather list element, and only the last PCI-Express memory write request TLP header 400 has the CERTIFY flag 406 set. In addition, the primary bus bridge 124A starts the certification timer 236 of FIG. 2 running. Flow proceeds to block 164.

At block 164, the secondary bus bridge 124B receives the PCI-Express memory write request TLP transmitted at block 163. In response, the secondary bus bridge 124B writes the TLP payload data (for example, a directory entry 602) to the secondary cache memory 144B at the address specified in the TLP header 400. Flow proceeds to block 165.

At block 165, the secondary bus bridge 124B detects that the CERTIFY flag 406 in the TLP header 400 received at block 164 is set. In response, the secondary bus bridge 124B transmits a delivery certificate to the primary bus bridge 124A on the PCI-Express link 118 to indicate that the payload data of the memory write request TLP received at block 164 has been successfully written to the secondary cache memory 144B. In one embodiment, the delivery certificate comprises a PCI-Express memory write request TLP with a header 401 according to FIG. 4B with the DELIVERED flag 408 set, although other embodiments are contemplated as described above. Flow proceeds to decision block 802.

At decision block 802, the primary bus bridge 124A determines whether the certification timer 236 has expired. In one embodiment, the CSRs 202 include an interrupt status register that the primary CPU 108A reads to determine the cause of the interrupt. If so, flow proceeds to block 804; otherwise, flow proceeds to block 166.

At block 804, the primary bus bridge 124A generates a timeout error interrupt to the primary CPU 108A. In an alternate embodiment, the primary CPU 108A, rather than the primary bus bridge 124A, performs the function of monitoring the certified memory-to-memory data transfer request for a timeout. In particular, at block 161 the primary CPU 108A starts a timer after it commands the primary bus bridge 124A to perform the certified memory-to-memory data transfer. If the primary CPU 108A timer expires at block 802, the primary CPU 108A performs error recovery operations in response to the timeout. In one embodiment, the primary CPU 108A handles the error by retrying the operation. In either case, if the operation fails after a predetermined number of retries, then the primary RAID controller 102A performs a failover operation, i.e., takes over control of the secondary disk arrays 116B for the failed secondary RAID controller 102B. Flow ends at block 804.

At block 166, the primary bus bridge 124A receives the delivery certificate transmitted by the secondary bus bridge 124B at block 165. In response, the primary bus bridge 124A generates an interrupt to the primary CPU 108A to indicate successful completion of the certified memory-to-memory transfer requested at block 161. In one embodiment, the CSRs 202 include an interrupt status register that the primary CPU 108A reads to determine the cause of the interrupt. Flow ends at block 166.

As mentioned above, although the certified memory-to-memory data transfer of FIG. 8 may be used to transfer write cache directory 602 information as described in FIG. 7, the certified memory-to-memory transfer method may also be used to transfer other data. For example, another use of the certified memory-to-memory transfer method is to transfer redundant RAID 5 parity data logs from the primary cache memory 144A to the secondary cache memory 144B. However, the use of the certified memory-to-memory transfer method is not limited to the types of data transfers described herein, but may be employed to make a memory-to-memory transfer of any data for which the primary CPU 108A requires a guarantee that the data has been transferred successfully to the secondary cache memory 144B without the secondary CPU 108B being involved in or knowing about the data transfer.

As mentioned above, PCI-Express provides a load-store architecture by virtue of its pedigree as a local bus. Consequently, the data transfer primitives provided by PCI-Express include only distinct Memory, I/O, Configuration, and Message transaction types directed to their respective address spaces. In particular, the Memory write transaction type does not include a non-posted transfer type. Hence, the requester of a memory write transaction does not receive a completion to indicate the success or failure of the data transfer. Additionally, although the I/O write transaction type provides a non-posted I/O write transfer type, the non-posted I/O write transaction type does not provide a practical solution for large high-speed data transfer requirements of a RAID controller for several reasons. First, I/O write requests are directed to the I/O address space, rather than memory address space. Second, I/O write requests allow a maximum length of only 4 bytes. Third, I/O write requests are limited to 32 address bits for addressing the I/O space. Finally, even though a non-posted I/O write request provides for a completion packet to be transmitted to the requester of the memory data transfer, there is no means for the automatic generation of an interrupt to the requester on reception of the completion packet; rather a separate distinct interrupt must be generated by the destination node, such as an MSI, which requires involvement by the higher level software executing on the CPU at the destination node. However, advantageously, described herein is a RAID controller system 100 that performs a certified memory-to-memory transfer across a PCI-Express link 118 in which the destination bus bridge 124 automatically transmits a delivery certificate without involving the destination CPU 108, and in which the requesting CPU 108 receives a certification interrupt to indicate the successful write of the data without involving the destination CPU 108.

As mentioned above, the system described in U.S. patent application Ser. No. 11/272,340 requires the bus bridge 124 to have knowledge of the structure of the directory 122 and its location in the cache memory 144. Advantageously, the embodiments of the system 100 of the present invention described herein enable the bus bridge 124 to be agnostic regarding the structure and location of the directory 122, and yet still reduce the amount of involvement of the CPUs 108 in the performance of the mirrored posted-write operation. In particular, the directory entry 602 structure may be changed without requiring modification of the bus bridge 124. Instead, the software executing on the CPU 108 may be changed to accommodate the change in the directory entry 602 structure.

Figure 9:
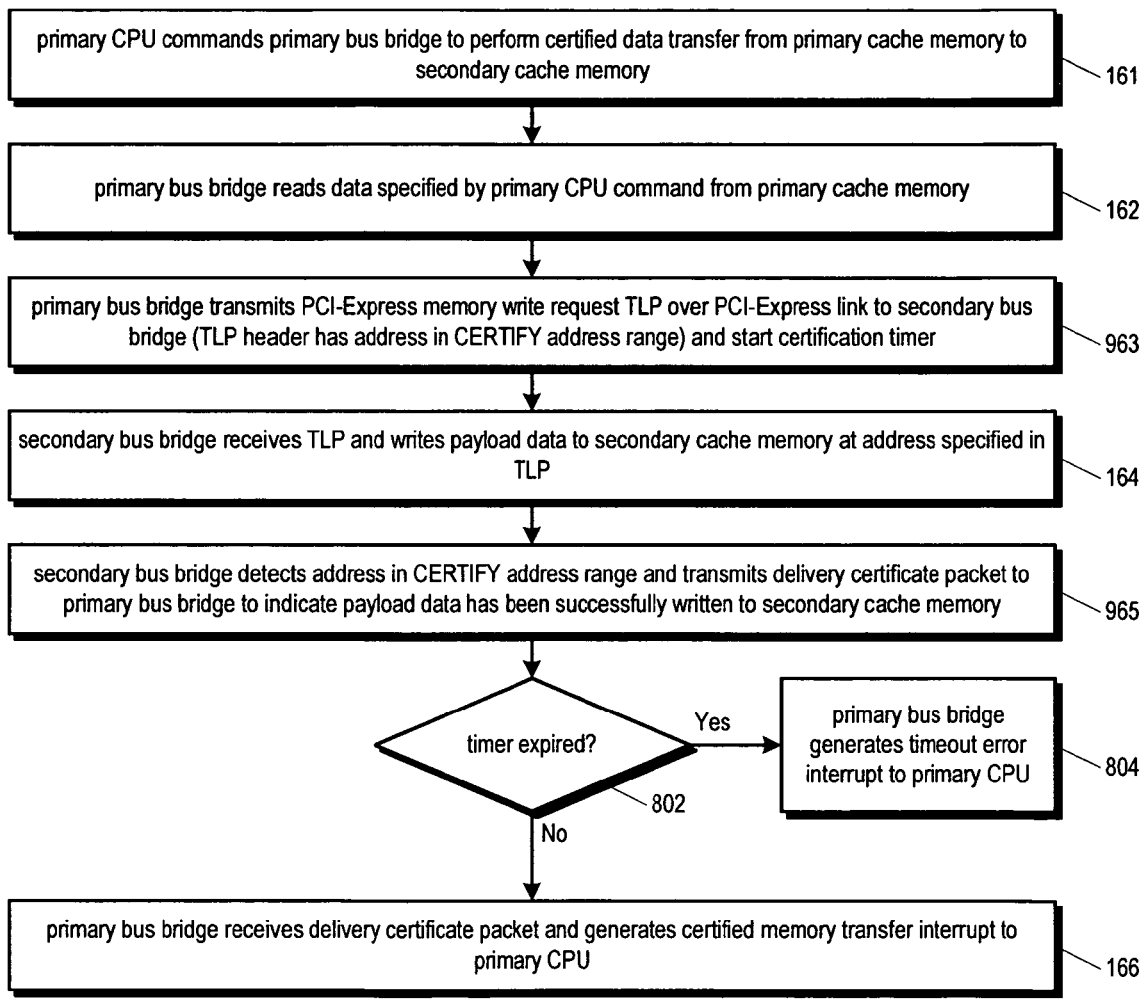
FIG. 9 is a flowchart illustrating operation of the system to perform a certified memory-to-memory transfer operation according to an alternate embodiment of the present invention.

Referring now to FIG. 9, a flowchart illustrating operation of the system 100 to perform a certified memory-to-memory transfer operation according to an alternate embodiment of the present invention is shown. The flowchart of FIG. 9 describes an embodiment in which a standard PCI-Express memory write request TLP may be employed to transfer the data, rather than requiring a modified TLP header 400 of FIG. 4A. The flowchart of FIG. 9 is similar to the flowchart of FIG. 8; however, block 963 of FIG. 9 replaces block 163 of FIG. 8 and block 965 of FIG. 9 replaces block 165 of FIG. 8.

At block 963, the primary bus bridge 124A transmits a PCI-Express memory write request TLP over the PCI-Express link 118 to the secondary bus bridge 124B similar to block 163. However, the TLP has a standard PCI-Express header 300 according to FIG. 3; but, the memory address specified in the Address field is within a predetermined CERTIFY address range. In one embodiment, the CERTIFY address range is programmed into a CSR 202 by the respective CPU 108 at boot time. In one embodiment, the CERTIFY address range for the secondary RAID controller 102B is the memory region occupied by the mirrored copy of the primary directory 122B-2, and the CERTIFY address range for the primary RAID controller 102A is the memory region occupied by the mirrored copy of the secondary directory 122A-2.

At block 965, the secondary bus bridge 124B is configured to recognize that if the TLP header 300 address is within the CERTIFY address range, the secondary bus bridge 124B is to transmit a delivery certificate on the PCI-Express link 118 to the primary bus bridge 124A after successfully writing the payload data to the secondary cache memory 144B at block 164.

Although the present invention and its objects, features, and advantages have been described in detail, other embodiments are encompassed by the invention. For example, although embodiments have been described in which the data payload of the certified memory-to-memory transfers is directory entry 602 information, other data may be transferred as described herein.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A system for performing a mirrored posted-write operation, comprising: first and second redundant array of inexpensive disks (RAID) controllers in communication via a PCI-Express link, each comprising a CPU, a write cache memory, and a bus bridge coupled to said CPU, said write cache memory, and said communications link;
   wherein said first bus bridge is configured to transmit a PCI-Express memory write request transaction layer packet (TLP) on said link to said second bus bridge, said TLP comprising payload data and a header, said header including an indication of whether a certification is requested by said first CPU, said certification certifying that said payload data has been written to said write cache memory of said second RAID controller;
   wherein if said indication requests said certification, said second bus bridge is configured to automatically transmit said certification to said first bus bridge independent of said second CPU, after writing said payload data to said write cache memory of said second RAID controller;
   and wherein said first bus bridge is configured to generate an interrupt to said first CPU in response to receiving said certification.

2. The system of claim 1, wherein said indication comprises a predetermined bit of a field of said TLP header interpreted by said second bus bridge as said indication.

3. The system of claim 1, wherein said second bus bridge comprises a storage element for storing an address range, wherein said indication comprises a memory address within said TLP header specifying a destination of said payload data in said second write cache, wherein said indication indicates said certification is requested if said memory address is within said address range.

4. The system of claim 1, wherein said payload data comprises a portion of a directory of said write cache indicating whether one or more write cache buffers of said write cache are valid.

5. The system of claim 1, wherein said payload data comprises a RAID 5 parity data log.

6. The system of claim 1, wherein said certification comprises a second PCI-Express TLP.

7. The system of claim 1, wherein said first bus bridge comprises:
   a timer, configured to commence running when said first bus bridge transmits said PCI-Express memory write request TLP on said link to said second bus bridge, wherein said first bus bridge is configured to interrupt said first CPU if said first bus bridge does not receive said certification from said second bus bridge within a predetermined time.

8. The system of claim 2, wherein said predetermined bit of said field of said TLP header indication comprises a predetermined address bit of the address field of said TLP header interpreted by said second bus bridge as said indication.

9. The system of claim 3, wherein said second CPU is configured to write said address range into said storage element at initialization time of said second RAID controller.

10. The system of claim 4, wherein said first CPU is configured to:
    command said first bus bridge to transfer said portion of said directory from said first write cache to said second write cache and generate said interrupt to said first CPU in response to receiving said certification, wherein said first bus bridge is configured to transmit said PCI-Express memory write request TLP on said link to said second bus bridge with said indication set to a predetermined value to request said certification, in response to said command from said first CPU; and
    invalidate said one or more write cache buffers in said portion of said directory, prior to commanding said first bus bridge to transfer said portion of said directory.

11. The system of claim 4, wherein said first CPU is configured to:
    command said first bus bridge to transfer said portion of said directory from said first write cache to said second write cache and generate said interrupt to said first CPU in response to receiving said certification, wherein said first bus bridge is configured to transmit said PCI-Express memory write request TLP on said link to said second bus bridge with said indication set to a predetermined value to request said certification, in response to said command from said first CPU; and
    validate said one or more write cache buffers in said portion of said directory, prior to commanding said first bus bridge to transfer said portion of said directory.

12. The system of claim 6, wherein the second TLP header includes a second indication certifying that said payload data has been written to said second write cache memory.

13. The system of claim 6, wherein said second PCI-Express TLP comprises a PCI-Express vendor-defined message TLP.

14. The system of claim 6, wherein said second PCI-Express TLP comprises a PCI-Express message-signaled interrupt (MSI) message TLP.

15. The system of claim 8, wherein said PCI-Express memory write request TLP has a 4 double word header with data format, wherein said predetermined address bit is one of bits 63 through 32 of the address field.

16. The system of claim 8, wherein said PCI-Express memory write request TLP has a 3 double word header with data format, wherein said predetermined address bit is bit 31 of the address field.

17. The system of claim 10, wherein said first bus bridge is configured to:
    write posted-write data to said first write cache and broadcast a copy of said posted-write data to said second bus bridge for writing to said second write cache, after generating said interrupt to said first CPU.

18. The system of claim 10, wherein said first CPU is configured to:
    commence running a timer after commanding said first bus bridge to transfer said portion of said directory; and
    determine if said first bus bridge does not generate said interrupt to said first CPU within a predetermined time.

19. The system of claim 12, wherein said second PCI-Express TLP comprises a PCI-Express memory write request TLP.

20. The system of claim 12, wherein said first bus bridge comprises a storage element for storing an address range, wherein said second indication comprises a memory address within the second TLP header, wherein said second indication certifies that said payload data has been written to said second write cache memory if said memory address is within said address range.

21. The system of claim 17, wherein said first CPU is further configured to:
validate said one or more write cache buffers in said portion of said directory, after said first bus bridge broadcasts said copy of said posted-write data to said second bus bridge; and
command said first bus bridge to transfer said validated portion of said directory from said first write cache to said second write cache and generate a second interrupt to said first CPU in response to receiving a second said certification, after validating said one or more write cache buffers in said portion of said directory.

22. The system of claim 17, wherein said first RAID controller further comprises:
a host interface, coupled to said first bus bridge, configured to receive said posted-write data received from a host computer coupled to said first RAID controller, and to write said posted-write write data to said first bus bridge, wherein said first bus bridge writes posted-write data to said first write cache and broadcasts said copy of said posted-write data in response to said host interface writing said posted-write write data to said first bus bridge.

23. The system of claim 11, wherein said first CPU is further configured to:
populate said portion of said directory with information specifying a disk drive of a disk drive array coupled to said first and second RAID controllers and a destination location on said disk drive of said posted-write data, prior to commanding said first bus bridge to transfer said validated portion of said directory from said first write cache to said second write cache.

24. The system of claim 11, wherein said first CPU is further configured to:
send good status regarding the mirrored posted-write operation to a host computer coupled to said first RAID controller, in response to receiving said second interrupt from said first bus bridge.

25. The system of claim 11, wherein said first bus bridge is configured to:
write posted-write data to said first write cache and broadcast a copy of said posted-write data to said second bus bridge for writing to said second write cache, before said first CPU commands said first bus bridge to transfer said portion of said directory.

26. The system of claim 21, wherein said first CPU is further configured to:
populate said portion of said directory with information specifying a disk drive of a disk drive array coupled to said first and second RAID controllers and a destination location on said disk drive of said posted-write data, prior to commanding said first bus bridge to transfer said validated portion of said directory from said first write cache to said second write cache.

27. The system of claim 21, wherein said first CPU is further configured to:
send good status regarding the mirrored posted-write operation to a host computer coupled to said first RAID controller, in response to receiving said second interrupt from said first bus bridge.

28. The system of claim 25, wherein said first CPU is further configured to:
invalidate said one or more write cache buffers in said portion of said directory, before said first bus bridge broadcasts said copy of said posted-write data to said second bus bridge; and
command said first bus bridge to transfer said invalidated portion of said directory from said first write cache to said second write cache and generate a second interrupt to said first CPU in response to receiving a second said certification, after invalidating said one or more write cache buffers in said portion of said directory.

29. The system of claim 25, wherein said first RAID controller further comprises:
a host interface, coupled to said first bus bridge, configured to receive said posted-write data received from a host computer coupled to said first RAID controller, and to write said posted-write write data to said first bus bridge, wherein said first bus bridge writes said posted-write data to said first write cache and broadcasts said copy of said posted-write data in response to said host interface writing said posted-write write data to said first bus bridge.

30. The system of claim 19, wherein said second indication comprises a predetermined bit of a field of said second memory write request TLP header interpreted by said first bus bridge as said second indication certifying that said payload data has been written to said second write cache memory.

31. A method for performing a certified memory-to-memory transfer operation between first and second redundant array of inexpensive disks (RAID) controllers in communication via a PCI-Express link, each comprising a CPU, a write cache memory, and a bus bridge coupled to the CPU, the write cache memory, and the communications link, the method comprising: the first bus bridge transmitting a PCI-Express memory write request transaction layer packet (TLP) on the link to the second bus bridge, the TLP comprising payload data and a header, the header including an indication of whether a certification is requested by the first CPU, the certification certifying that the payload data has been written to the write cache memory of said second RAID controller;
the second bus bridge determining whether the indication requests the certification;
the second bus bridge automatically transmitting the certification to the first bus bridge independent of the second CPU, after writing the payload data to the write cache memory of said second RAID controller, if the indication requests the certification; and
the first bus bridge generating an interrupt to the first CPU in response to receiving the certification.

32. The method of claim 31, wherein the payload data comprises a portion of a directory of the write cache indicating whether one or more write cache buffers of the write cache are valid.

33. The method of claim 31, wherein the payload data comprises a RAID 5 parity data log.

34. The method of claim 31, wherein the certification comprises a second PCI-Express TLP.

35. The method of claim 31, further comprising:
the first bus bridge commencing running a timer when the first bus bridge transmits the PCI-Express memory write request TLP on the link to the second bus bridge;
the first bus bridge interrupting the first CPU if the first bus bridge does not receive the certification from the second bus bridge within a predetermined time.

36. The method of claim 32, further comprising:
the first CPU commanding the first bus bridge to transfer the portion of the directory from the first write cache to the second write cache and generate the interrupt to the first CPU in response to receiving the certification, wherein the first bus bridge is configured to transmit the PCI-Express memory write request TLP on the link to the second bus bridge with the indication set to a predetermined value to request the certification, in response to said first CPU commanding; and the first CPU invalidating the one or more write cache buffers in the portion of the directory, prior to said first CPU commanding the first bus bridge to transfer the portion of the directory.

37. The method of claim 32, further comprising:
the first CPU commanding the first bus bridge to transfer the portion of the directory from the first write cache to the second write cache and generate the interrupt to the first CPU in response to receiving the certification, wherein the first bus bridge is configured to transmit the PCI-Express memory write request TLP on the link to the second bus bridge with the indication set to a predetermined value to request the certification, in response to said first CPU commanding; and
the first CPU validating the one or more write cache buffers in the portion of the directory, prior to said commanding the first bus bridge to transfer the portion of the directory.

38. The method of claim 36, further comprising:
the first bus bridge writing posted-write data to the first write cache and broadcasting a copy of the posted-write data to the second bus bridge for writing to the second write cache, after said generating the interrupt to the first CPU.

39. The method of claim 36, further comprising:
the first CPU commencing running a timer after said commanding the first bus bridge to transfer the portion of the directory; and
the first CPU determining if the first bus bridge does not generate the interrupt to the first CPU within a predetermined time.

40. The method of claim 38, further comprising:
the first CPU validating the one or more write cache buffers in the portion of the directory, after said first bus bridge broadcasting the copy of the posted-write data to the second bus bridge; and
the first CPU commanding the first bus bridge to transfer the validated portion of the directory from the first write cache to the second write cache and generate a second interrupt to the first CPU in response to receiving a second certification, after said validating the one or more write cache buffers in the portion of the directory.

41. The method of claim 40, further comprising:
the first CPU populating the portion of the directory with information specifying a disk drive array coupled to the first and second RAID controllers and a destination location on the disk drive array of the posted-write data, prior to said commanding the first bus bridge to transfer the validated portion of the directory from the first write cache to the second write cache.

42. The method of claim 40, further comprising:
the first CPU sending good status regarding the mirrored posted-write operation to a host computer coupled to the first RAID controller, in response to receiving the second interrupt from the first bus bridge.

43. The method of claim 37, further comprising:
the first CPU populating the portion of the directory with information specifying a disk drive array coupled to the first and second RAID controllers and a destination location on the disk drive array of the posted-write data, prior to said commanding the first bus bridge to transfer the validated portion of the directory from the first write cache to the second write cache.

44. The method of claim 37, further comprising:
the first CPU sending good status regarding the mirrored posted-write operation to a host computer coupled to the first RAID controller, in response to receiving the second interrupt from the first bus bridge.

45. The method of claim 37, further comprising:
the first bus bridge writing posted-write data to the first write cache and broadcasting a copy of the posted-write data to the second bus bridge for writing to the second write cache, before said first CPU commanding the first bus bridge to transfer the portion of the directory.

46. The method of claim 45, further comprising:
the first CPU invalidating the one or more write cache buffers in the portion of the directory, before said first bus bridge broadcasting the copy of the posted-write data to the second bus bridge; and
the first CPU commanding the first bus bridge to transfer the invalidated portion of the directory from the first write cache to the second write cache and generate a second interrupt to the first CPU in response to receiving a second said certification, after said invalidating the one or more write cache buffers in the portion of the directory.

47. A bus bridge, for instantiation on each of primary and secondary redundant array of inexpensive disks (RAID) controllers coupled for communication on a PCI-Express link, the bus bridge comprising: a PCI-Express interface, configured for coupling to the PCI-Express link;
a local bus interface, configured for coupling to a CPU of the respective RAID controller;
a memory bus interface, configured for coupling to a write cache memory of the respective RAID controller;
and control logic, coupled to and configured to control said PCI-Express interface, said local bus interface, and said memory bus interface;
wherein said primary control logic is configured to control said primary PCI-Express interface to transmit a PCI-Express memory write request transaction layer packet (TLP) on said link, said TLP comprising payload data and a header, said header including an indication of whether a certification is requested by said primary CPU, said certification certifying that said payload data has been written to said write cache memory of said secondary RAID controller;
wherein, said secondary control logic is configured to determine whether said indication received by said secondary PCI-Express interface requests said certification, and to automatically control said secondary PCI-Express interface to transmit said certification on said link independent of said secondary CPU, after controlling said secondary memory bus interface to write said payload data to said write cache memory of said secondary RAID controller, if said indication requests said certification; and
wherein said primary control logic is configured to control said local bus interface to generate an interrupt to said primary CPU in response to said primary PCI-Express interface receiving said certification.

48. The bus bridge of claim 47, wherein said payload data comprises a portion of a directory of said primary write cache indicating whether one or more write cache buffers of said primary write cache are valid.

49. The bus bridge of claim 47, wherein said control logic comprises:
a timer, configured to commence running when said primary PCI-Express interface transmits said PCI-Express memory write request TLP on said link, wherein said primary control logic is configured to cause said primary local bus interface to interrupt said primary CPU if said primary PCI-Express interface does not receive said certification from said secondary bus bridge within a predetermined time.

50. The bus bridge of claim 48, wherein said primary local bus interface is configured to receive from said primary CPU a command for said primary bus bridge to transfer an invalidated said portion of said directory from said primary write cache to said secondary write cache and generate said interrupt to said primary CPU in response to receiving said certification, wherein said primary control logic is configured to control said primary PCI-Express interface to transmit said PCI-Express memory write request TLP on said link with said indication set to a predetermined value to request said certification, in response to said command from said primary CPU.

51. The bus bridge of claim 50, wherein said primary control logic is configured to:
 control said primary memory bus interface to write posted-write data to said primary write cache and broadcast a copy of said posted-write data on said link for writing to said secondary write cache, after controlling said primary local bus interface to generate said interrupt to said primary CPU.

52. The bus bridge of claim 51, wherein said primary local bus interface is configured to receive from said primary CPU a second command for said primary bus bridge to transfer a validated said portion of said directory from said primary write cache on said link for said secondary bus bridge to write to said secondary write cache and to generate a second interrupt to said primary CPU in response to receiving a second said certification.

53. The bus bridge of claim 51, further comprising:
 a second local bus interface, configured for coupling to a host interface of said primary RAID controller, said primary second local bus interface configured to receive said posted-write data received by said host interface from a host computer coupled to said primary RAID controller.

54. The bus bridge of claim 51, further comprising:
 a second local bus interface, configured for coupling to a disk interface of said primary RAID controller, said primary second local bus interface configured to write said posted-write data to said disk interface for writing to one or more disk drives coupled to said primary RAID controller.

55. The bus bridge of claim 53, further comprising:
 a third local bus interface, configured for coupling to a disk interface of said primary RAID controller, said primary third local bus interface configured to write said posted-write data to said disk interface for writing to one or more disk drives coupled to said primary RAID controller.

\* \* \* \* \*